US008026986B2

(12) United States Patent
Izawa et al.

(10) Patent No.: US 8,026,986 B2
(45) Date of Patent: Sep. 27, 2011

(54) PROJECTION TYPE DISPLAY DEVICE

(75) Inventors: Shunsuke Izawa, Kanagawa-ken (JP); Takashi Moroboshi, Kanagawa-ken (JP); Tetsuji Suzuki, Kanagawa-ken (JP); Manabu Endou, Kanagawa-ken (JP); Yasuo Ishizaka, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 209 days.

(21) Appl. No.: 12/585,546

(22) Filed: Sep. 17, 2009

(65) Prior Publication Data

US 2010/0073585 A1    Mar. 25, 2010

(30) Foreign Application Priority Data

Sep. 19, 2008  (JP) ................ P2008-241262
Jun. 11, 2009  (JP) ................ P2009-140617

(51) Int. Cl.
    *G02F 1/1335*    (2006.01)

(52) U.S. Cl. ........... 349/8; 349/1; 349/5; 349/9; 349/56; 349/84

(58) Field of Classification Search ............... 349/1, 5, 349/8, 9, 56, 84, 113
See application file for complete search history.

(56) References Cited

U.S. PATENT DOCUMENTS

| 6,669,343 | B2 * | 12/2003 | Shahzad et al. | 353/20 |
| 7,102,822 | B2 * | 9/2006 | Sedlmayr | 359/487.04 |
| 7,204,592 | B2 * | 4/2007 | O'Donnell et al. | 353/7 |

FOREIGN PATENT DOCUMENTS

| JP | 2002-072217 | 3/2002 |
| JP | 2007-101764 | 4/2007 |
| JP | 2007-212997 | 8/2007 |

* cited by examiner

*Primary Examiner* — Jennifer Doan
(74) *Attorney, Agent, or Firm* — The Nath Law Group; Jerald L. Meyer; Derek Richmond

(57) ABSTRACT

A projection type display device is provided to display high quality images. In the device, a WB-PBSW 2 is inclined to liquid crystal display devices 1r, 1b, 1g and has wire grids 2a parallel with a first substrate 11. One of directions of projection lines obtained by projecting the wire grids 2a on a second substrate 12 vertically, the one direction being directed to a direction where one extension surface of the polarization spectroscopic surface intersects with another extension surface of the second substrate when the one direction is turned in the counterclockwise direction by 90°, is defined as X-axis. If the liquid crystal display devices 1r, 1b, 1g are a type of first twist (normal twist), device reference line vectors are located at 225°±10° in the counterclockwise direction in view from the first substrate 11. In case of a second twist (reverse twist) type, the device reference line vectors are located at 315°±10° in the counterclockwise direction in view from the first substrate 11.

7 Claims, 18 Drawing Sheets

SUBSTRATE FACE

SIDE OF POLARIZING PLATE (ANALYZER)

SIDE OF POLARIZING PLATE (ANALYZER)

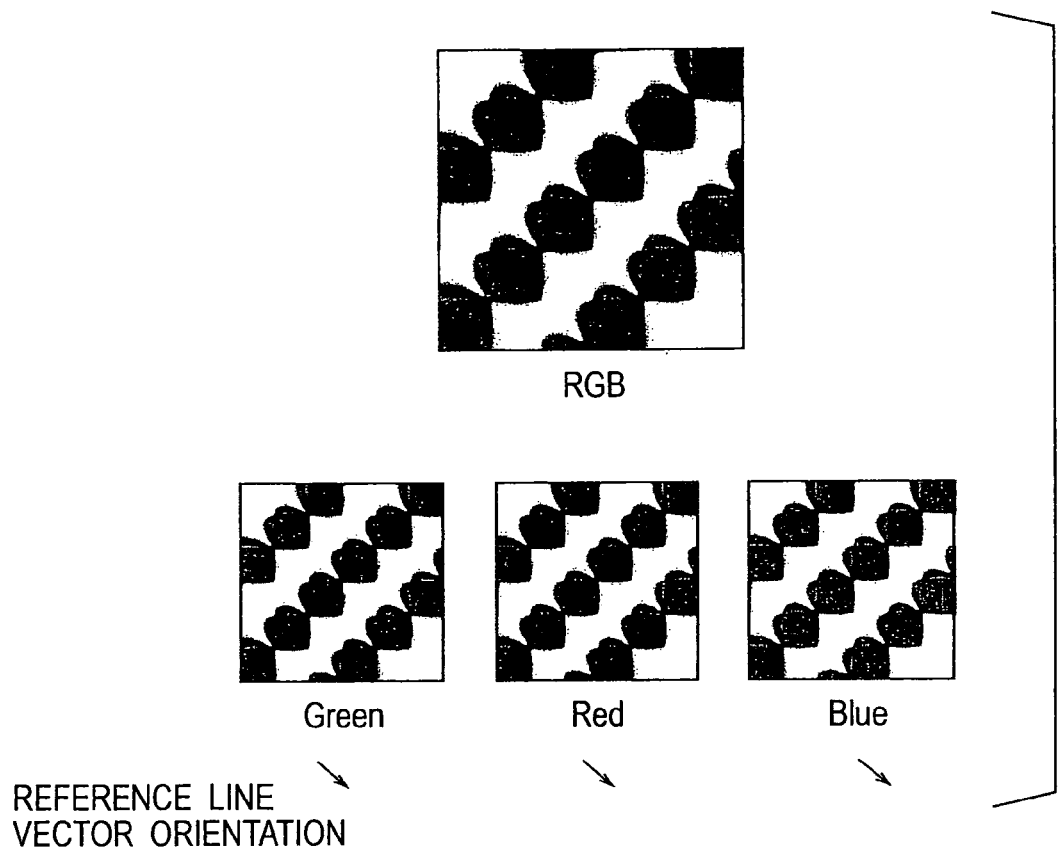

AZIMUTH ANGLE OF
INCIDENT LIGHT 0(deg)

90(deg)

180(deg)

270(deg)

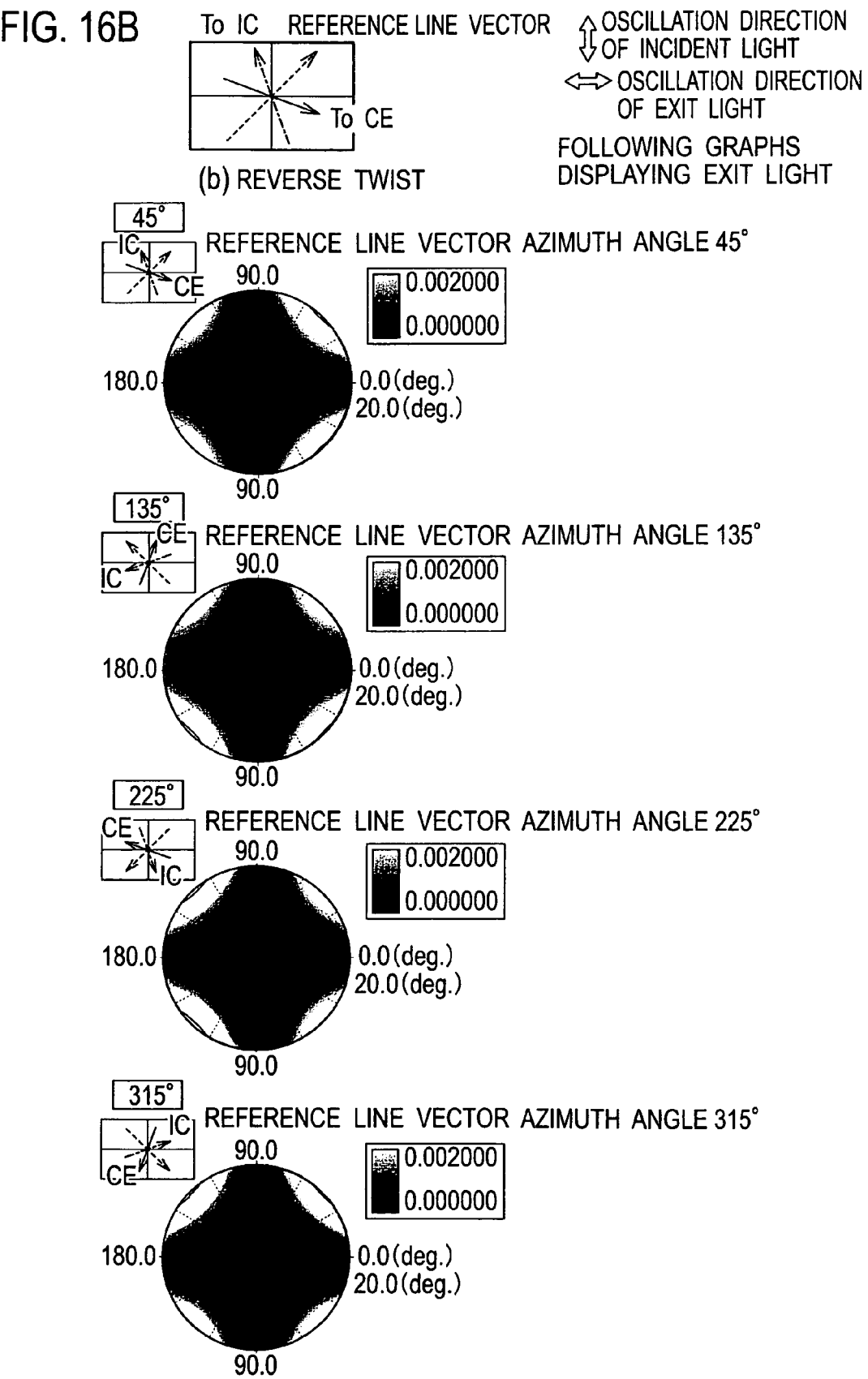

PROJECTION TYPE DISPLAY DEVICE

BACKGROUND OF THE INVENTION

1. Field of the Invention

The present invention relates to a projection type display device constructed with a reflection type liquid crystal display device, more particularly to a projection type display device capable of enhancing contrast of display images and preventing a quality deterioration of the display images due to disclination.

2. Description of the Related Art

In recent years, a projection type display device using a liquid crystal display device is proposed. This projection type display device is often used in the form of an image magnification equipment at presentations or in a home theater. Thus, a variety of displaying formalities have been developed.

Especially, as discussed in Japanese Patent Publication Laid-open No. 2007-101764, the projection type display device using a reflection type liquid crystal display device is capable of displaying bright images at a high resolution. Because the reflection type liquid crystal device comprises one substrate having transparent electrodes formed on its surface, another substrate opposed to the former substrate and having reflecting electrodes and drive circuits for every pixel arranged in matrix and a liquid crystal layer enclosed between these opposing substrates, allowing the drive circuits for liquid crystal to be arranged underside the pixels for display.

In addition, since the liquid crystal layer utilizes the reflection type liquid crystal display device of vertically-aligned liquid crystals, and the projection type display device is adapted so as to allow light to be incident on the reflection type liquid crystal display device through a wire grid polarizing beam splitter (referred to as "WG-PBS" hereinafter), the same device is capable of display images at high contrast.

Such a projection type display device is shown in FIG. 1. The projection type display device comprises a reflection type liquid crystal display (reflective LCD) device 1 and a wire grid polarizing beam splitter (WG-PBS) 2 arranged at an inclination angle of 45° to the reflective LCD device 1. The reflective LCD device 1 comprises a transparent substrate 11 having transparent electrodes formed thereon, an active matrix substrate 12 opposed to the substrate 11 and having reflecting electrodes and drive circuits for every pixel arranged in matrix and a liquid crystal layer 13 enclosed in a gap between the substrate 11 and the substrate 12.

The WG-PBS 2 includes a number of wire grids (WG) 2a formed on a transparent flat plate. In the WG-PBS 2, the wire grids (WG) 2a are arranged in parallel to the reflective LCD device 1. In illumination light incident on the WG-PBS 2, its P polarization component as the incident light on the LCD device 1 is transmitted through the WG-PBS 2, while its S polarization component is reflected by the WG-PBS 2. The P polarization component of the illumination light transmitted through the WG-PBS 2 is then incident on the LCD device 1.

The reflective LCD device 1 polarizes and modulates the incident illumination light in accordance with image signals and then reflects the same light. The modulated light reflected by the LCD device 1 returns to the WG-PBS 2. In the modulated light, its S polarization component only is reflected by the WG-PBS 2, while its P polarization component is transmitted through the WG-PBS 2 to be a return light for the incident modulation direction of the illumination light. Then, the modulated light reflected by the WG-PBS 2 is transmitted through an analyzer (e.g. a polarizing plate) 3 and then incident on a not-shown imaging lens system to project the light on a screen for imaging. Note that the analyzer 3 is an optical device for analyzing the modulated light reflected by the WG-PBS 2.

In the reflective LCD device 1, alignment layers 14, 15 are formed on respective surfaces of the transparent substrate 11 and the active matrix substrate 12 on the side of the liquid crystal layer 13, respectively. In operation, these alignment layers 14, 15 impart liquid-crystal molecules alignment condition to liquid crystal molecules forming the liquid crystal layer 13, as shown in FIG. 2. Japanese Patent Publication Laid-open No. 2007-101764 exhibits the liquid-crystal molecules alignment condition to obtain high-contrast display images in the projection type display device combining the reflective LCD device 1 having the liquid crystal layer 13a composed of such liquid crystal molecules in vertical alignment with the WG-PBS 2.

In this projection type display device, that is, the liquid-crystal molecules alignment in the liquid crystal layer 13 of the reflective LCD device 1 is defined as a direction to meet a predetermined condition in the relationship with the WG-PBS 2, as shown in FIG. 3 or FIG. 4. In the projection type display device, nematic LC (liquid crystal) having negative dielectric anisotropy is used as liquid crystal, and a pre-tilt angle θp is given to liquid crystal molecules 16-1, 16-2. Assume here, one of directions of projection lines obtained by projecting the wire grids 2a of the WG-PBS 2 on the active matrix substrate 12 vertically, the one direction being directed to a direction where one extension surface of the polarization spectroscopic surface intersects with another extension surface of the active matrix substrate 12 when the one direction is turned in the counterclockwise direction by 90°, is represented by X-axis. Based on the assumption, an angle α from X-axis up to a line segment 17-1 obtained by projecting respective a long axis of the liquid crystal molecule 16-1 onto the active matrix substrate 12 is 45° (see FIG. 3). Here, the line segment 17-1 is positioned in the counterclockwise direction from X-axis in view from the transparent substrate 11. Similarly, another angle α from X-axis up to another line segment 17-2 obtained by projecting respective a long axis of the liquid crystal molecule 16-21 onto the active matrix substrate 12 is also 45° (see FIG. 4). Here, the line segment 17-2 is positioned in the clockwise direction from X-axis in view from the transparent substrate 11.

As for the above liquid-crystal molecules alignment condition, if representing the projective line segments 17-1, 17-2 by vectors upon the establishment of X-Y-Z axes on the active matrix substrate 12 as shown in FIGS. 3 and 4, then respective vectors 17-1, 17-2 are illustrated on X-Y plane, as shown FIGS. 5A and 5B. When defining the azimuth angles of the liquid crystal molecules 16-1, 16-2 by angles φ from X-axis, the vector 17-1 is represented by an angle φ of 225° in the counterclockwise direction as shown in FIG. 5A, while the vector 17-2 is represented by an angle φ of 315° in the counterclockwise direction as shown in FIG. 5B.

In the reflective LCD device, meanwhile, it is generally believed when an angle between the direction of a line segment, which is obtained by projecting a liquid crystal molecule in the liquid crystal layer on a substrate surface, and the vibrating direction of an incident polarized light becomes near 45°, there can be attained a light state and a maximum output (i.e. brightness). In detail, as disclosed in the specification of U.S. Pat. No. 4,127,322, an output T in the liquid crystal display device can be represented by $$T = K \cdot \sin^2(2\phi) \cdot \sin^2(\pi \cdot \Delta neff \cdot d/\lambda) \quad (1)$$

here K is a constant, φ an azimuth angle, Δneff an effective double refraction of liquid crystal molecule, d a thickness of liquid crystal cell and λ is a wavelength of incident polarization light.

From the operation expression, it will be understood that the azimuth angles providing a maximum output are 45°, 135°, 225° and 315°.

That is, the maximum outputs in light state can be provided at four azimuth angles φ (i.e. 45°, 135°, 225° and 315° in the counterclockwise direction in FIGS. 5A and 5B).

On the other hand, the brightness in dark state at the azimuth angle φ of 45° in the counterclockwise direction or at 135° in the same direction greatly differs from the brightness in light state at the azimuth angle φ of 225° in the counterclockwise direction or at 315° in the same direction. Thus, in case of the azimuth angle φ of 225° or 315° in the counterclockwise direction, the brightness in dark state turns down. Therefore, under the liquid-crystal molecules alignment condition where the azimuth angle φ is either 225° or 315° in the counterclockwise direction, it becomes possible to realize the maximum contrast ratio while ensuring the output (brightness) in light state greatly.

While, aiming to provide a liquid crystal device using vertically-aligned liquid crystal molecules attaining high-contrast images in spite of obliquely-incident light, Japanese Patent Publication Laid-open No. 2002-072217 proposes a vertically-aligned reflection type liquid crystal display device including a pair of substrates having electrodes on their opposed substrate surfaces, a liquid crystal layer containing vertically-aligned liquid crystal molecules and interposed between the substrates, and alignment layers arranged on the substrate surfaces and alignment-processed so as to twist the pre-tilt direction of the vertically-aligned liquid crystal molecules between the substrate.

Further, in Japanese Patent Publication Laid-open No. 2007-212997, the twist angle is set to a predetermined condition and the application to a projection type display device using a WG-PBS is discussed.

However, Japanese Patent Publication Laid-open No. 2007-212997 does not teach a condition of realizing high-contrast images in the projection type display device combining a WG-PBS clearly.

In addition, although an application of slight slant (pre-tilt angle) on the liquid crystal molecules unidirectionally prevents the falling direction of the molecules from being disrupting to cause a disclination, it could not be eliminated perfectly. Thus, if applying this on the projection type display device combining a WG-PBS, there is a possibility of exerting a bad influence on the screen depending on the application. Typically, this bad influence would appear in the form of a phenomenon that an oblique line of a projected picture is displayed with a color far from the original color.

SUMMARY OF THE INVENTION

Under the above-mentioned situation, an object of the present invention is to clarify conditions enabling the influence of disclination to be minimized while maintaining high-contrast images in the projection type display device combining a vertically-aligned reflection type liquid crystal display device having a twist with a WG-PBS.

In order to achieve the above objects, according to the first aspect of the present invention, there is provided a projection type display device comprising: a light source; a reflection type liquid crystal display device allowing an incidence of an illumination light from the light source through a wire-grid type polarization beam splitter for polarizing the illumination light; and an imaging lens system for providing an image from a modulated light which has been polarized, modulated and reflected by the reflection type liquid crystal display device and subsequently diverged from an optical path for the light source by the wire-grid type polarization beam splitter, wherein the reflection type liquid crystal display device includes a first transparent substrate having a transparent electrode formed therein and allowing an incidence of the illumination light, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative, the wire-grid type polarization beam splitter is arranged so as to have its polarization spectroscopic surface inclined to the first substrate of the reflection type liquid crystal display device, the wire-grid type polarization beam splitter also having wire grids formed on the polarization spectroscopic surface and also arranged parallel to the first substrate, the each of the reflection type liquid crystal display devices is either:
  a first twist type liquid crystal display device where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line; or
  a second twist type liquid crystal display device where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the wire-grid type polarization beam splitters are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the first twist type liquid crystal display device has its reference line's vector disposed within a range of 225°±10° in the counterclockwise direction from the direction of X-axis, in view from the first substrate, and the second twist type liquid crystal display device has its reference line's vector disposed within a range of 315°±10° in the counterclockwise direction from the direction of X-axis, in view from the first substrate.

According to the second aspect of the present invention, there is also provided a projection type display device comprising: illumination-light generating means for generating multicolor illumination lights containing different band components from each other; reflection type liquid crystal display devices for respective colors allowing an incidence of the multicolor illumination lights from the illumination-light generating means through wire-grid type polarization beam splitters for polarizing the multicolor illumination lights respectively; color synthesizing means for synthesizing modulated lights for respective colors, the modulated lights being produced since the illumination lights have been polarized, modulated and reflected by the reflection type liquid crystal display devices and successively diverged from an optical path for the illumination-light generating means by the wire-grid type polarization beam splitters; and an imaging lens system for providing an image from the modulated lights transmitted through the color synthesizing means, wherein:

each of the reflection type liquid crystal display devices includes a first transparent substrate having a transparent electrode formed therein and allowing an incidence of one of the illumination lights, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative, the each of the reflection type liquid crystal display devices is either:

a first twist type liquid crystal display device where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line; or a second twist type liquid crystal display device where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the wire-grid type polarization beam splitters are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming, for each of the reflection type liquid crystal display devices, one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the first twist type liquid crystal display device has its reference line's vector disposed within a range of $225°\pm10°$ in the counterclockwise direction from the direction of X-axis, in view from the first substrate, and the second twist type liquid crystal display device has its reference line's vector disposed within a range of $315°\pm10°$ in the counterclockwise direction from the direction of X-axis, in view from the first substrate.

According to the third aspect of the present invention, there is also provided a projection type display device comprising: illumination-light generating means for generating illumination lights corresponding to three primary colors of light respectively; reflection type liquid crystal display devices for respective colors on which illumination lights in corresponding primary-color band components are incident after the illumination lights have been polarized by wire-grid type polarization beam splitters arranged corresponding to the illumination lights in red, blue and green; color synthesizing means having a first optical multilayer membrane for reflecting only a light in red of the three primary colors selectively and transmitting lights in blue and green and a second optical multilayer membrane for reflecting only the light in blue of the three primary colors selectively and transmitting the lights in red and green, the first optical multilayer membrane intersecting with the second optical multilayer membrane perpendicularly, thereby to synthesize modulated lights for respective colors, the modulated lights being produced since the illumination lights have been polarized, modulated and reflected by the reflection type liquid crystal display devices and successively diverged from an optical path for the illumination-light generating means by the wire-grid type polarization beam splitters; and an imaging lens system for providing an image from the modulated lights transmitted through the color synthesizing means, wherein:

each of the reflection type liquid crystal display devices includes a first transparent substrate having a transparent electrode formed therein and allowing an incidence of one of the illumination lights, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative, the reflection type liquid crystal display devices comprises:

one first twist type liquid crystal display device for green where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line, the first twist type liquid crystal display device for green allowing an incidence of the illumination light in green; and two second twist type liquid crystal display devices for red and blue where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the second twist type liquid crystal display devices for red and blue allowing an incidence of the illumination lights in red and blue respectively, the wire-grid type polarization beam splitters for respective colors are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming, for each of the reflection type liquid crystal display devices, one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the one second twist type liquid crystal display device for red has its reference line's vector disposed within a range of 315°±10° in the counterclockwise direction from the direction of X-axis, in view from the first substrate, the other second twist type liquid crystal display device for blue its reference line's vector disposed within a range of 135°±10° in the counterclockwise direction from the direction of X-axis, in view from the first substrate, and the first twist type liquid crystal display device for green has its reference line's vector disposed within a range of 225°±10° in the counterclockwise direction from the direction of X-axis, in view from the first substrate the modulated light in red from the second twist type liquid crystal display devices for red is reflected by the first optical multilayer membrane of the color synthesizing means, the modulated light in blue from the second twist type liquid crystal display device for blue is reflected by the second optical multilayer membrane of the color synthesizing means, and the modulated light in green from the first twist type liquid crystal display device for green is transmitted through the first optical multilayer membrane and the second optical multilayer membrane of the color synthesizing means.

According to the fourth aspect of the present invention, there is also provided a projection type display device comprising: illumination-light generating means for generating illumination lights corresponding to three primary colors of light respectively; reflection type liquid crystal display devices for respective colors on which illumination lights in corresponding primary-color band components are incident after the illumination lights have been polarized by wire-grid type polarization beam splitters arranged corresponding to the illumination lights in red, blue and green; color synthesizing means having a first optical multilayer membrane for reflecting only a light in red of the three primary colors selectively and transmitting lights in blue and green and a second optical multilayer membrane for reflecting only the light in blue of the three primary colors selectively and transmitting the lights in red and green, the first optical multilayer membrane intersecting with the second optical multilayer membrane perpendicularly, thereby to synthesize modulated lights for respective colors, the modulated lights being produced since the illumination lights have been polarized, modulated and reflected by the reflection type liquid crystal display devices and successively diverged from an optical path for the illumination-light generating means by the wire-grid type polarization beam splitters; and an imaging lens system for providing an image from the modulated lights transmitted through the color synthesizing means, wherein:

each of the reflection type liquid crystal display devices includes a first transparent substrate having a transparent electrode formed therein and allowing an incidence of one of the illumination lights, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative, the reflection type liquid crystal display devices comprises:

two first twist type liquid crystal display device for red and blue where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line, the first twist type liquid crystal display devices for red and blue allowing an incidence of the illumination lights in red and blue respectively; and one second twist type liquid crystal display devices for green where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the second twist type liquid crystal display device for green allowing an incidence of the illumination light in green, the wire-grid type polarization beam splitters for respective colors are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming, for each of the reflection type liquid crystal display devices, one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the one first twist type liquid crystal display device for red has its reference line's vector disposed within a range of 225°±10° in the counterclockwise direction from the direction of X-axis, in view from the first substrate, the other first twist type liquid crystal display device for blue its reference line's vector disposed within a range of 45°±10° in the counterclockwise direction from the direction of X-axis, in view from the first substrate, and the second twist type liquid crystal display device for green has its reference line's vector disposed within a range of 315°±10° in the counterclockwise direction from the direction of X-axis, in view from the first substrate the modulated light in red from the first twist type liquid crystal display devices for red is reflected by the first optical multilayer membrane of the color synthesizing means, the modulated light in blue from the first twist type liquid crystal display device for blue is reflected by the second optical multilayer membrane of the color synthesizing means, and the modulated light in green from the second twist type liquid crystal display device for green is transmitted through the first optical multilayer membrane and the second optical multilayer membrane of the color synthesizing means.

BRIEF DESCRIPTION OF THE DRAWINGS

FIG. 6B is an enlarged view of an example of full-color displaying when disclinations occurring in the reflection type liquid crystal display device (due to a voltage difference between adjacent pixels in the active matrix substrate) are identical to each other in respective R, G, B colors;

FIGS. 16A and 16B are views showing the result of simulating respective angular dependencies of the reflection type liquid crystal display device of normal twist type and the reflection type liquid crystal display device of reverse twist type;

DETAILED DESCRIPTION OF THE PREFERRED EMBODIMENTS

Referring to drawings, various embodiments of a projection type display device of the present invention will be described below, in detail.

(Constitution of Projection Type Display Device)

Figure 1:
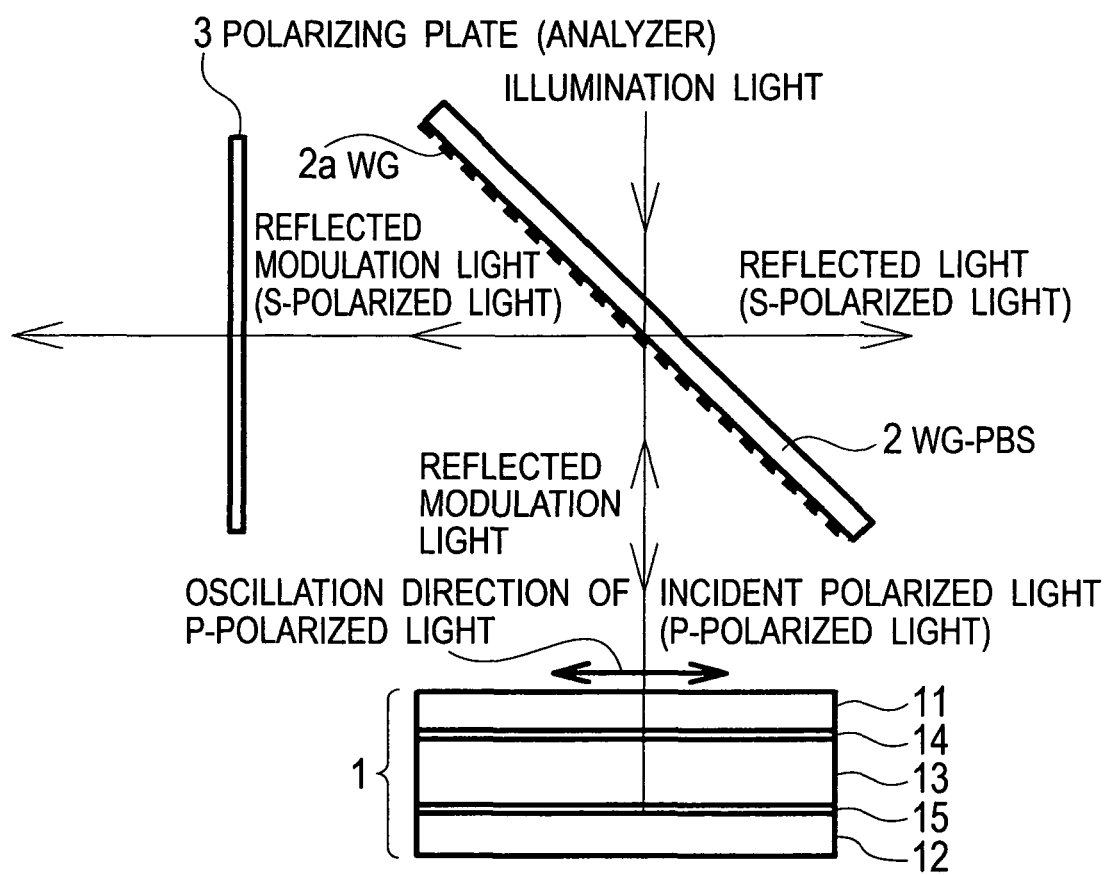
FIG. 1 is a side view showing the schematic structure of an optical system of a monochromatic processing part of a projection type display device on application of a reflection type liquid crystal display device of the present invention.
Figure 2:
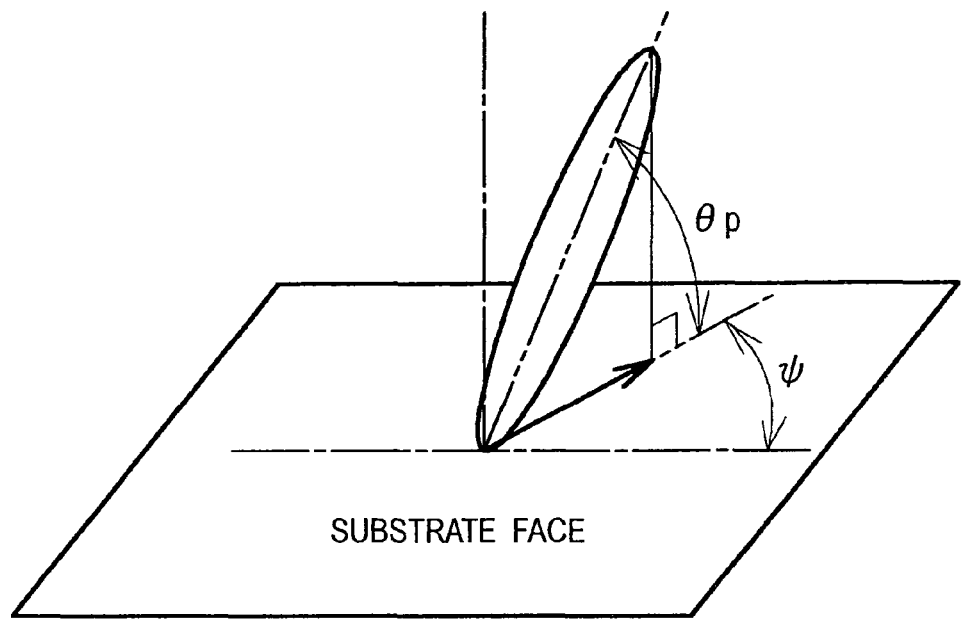
FIG. 2 is a view showing the alignment of a liquid crystal molecule in vertical alignment in the reflection type liquid crystal display device under no applied voltage.

FIG. 1 is a side view showing the schematic structure of an optical system of a monochromatic processing part of a projection type display device on application of a reflection type liquid crystal display device of the present invention.

The projection type display device of the present invention includes a plurality of monochromatic processing parts and is capable of displaying color images by synthesizing monochromatic modulated lights via the monochromatic processing parts. Alternatively, the projection type display device of the present invention may be provided with a single monochromatic processing part for a projection type display device displaying single-color images.

Similarly to the previously-mentioned projection type display device in the related art, as shown in FIG. 1, the monochromatic processing part of the projection type display device of the invention comprises a reflection type liquid crystal display (reflective LCD) device 1 and a wire grid polarizing beam splitter (WG-PBS) 2 arranged at an inclination angle of 45 degrees to the reflective LCD device 1.

The reflective LCD device 1 comprises a transparent substrate (first substrate) 11 having transparent electrodes formed thereon and allowing an incidence of illumination light, an active matrix substrate (second substrate) 12 opposed parallel to the substrate 11 through a gap to reflect the illumination light incoming through the transparent substrate 11 and then emit the same light through it, and a liquid crystal layer 13 enclosed in between the substrate 11 and the substrate 12 to polarize and modulate the incident illumination light transmitted through the transparent substrate 11. Note that the transparent substrate 11 may be also referred to as "CE" after, while referring the active matrix substrate 12 to as "IC". In addition, in the active matrix substrate 12, there are a reflecting electrode and a drive circuit with respect to each pixel in matrix arrangement. The liquid crystal layer 13 is formed by nematic liquid crystal whose dielectric anisotropy is negative. The so-formed reflective LCD device 1 is identical to a vertically-aligned reflection type liquid crystal device of either first twist type (referred to as "normal twist type" after) or second twist type (referred to as "reverse twist type" after).

In the WG-PBS 2, there are a number of wore grids (WG) 2a on a polarization spectroscopic surface as one principle surface of the transparent flat plate. Thus, the WG-PBS 2 has its polarization spectroscopic surface inclined to the transparent substrate 11 of the reflective LCD device 1 and the wire grids 2a arranged parallel to the transparent substrate 11. As for the illumination light from a not-shown light source, its P polarization component is transmitted through the WG-PBS 2 to be an incident light on the reflective LCD device 1, while the S polarization component is reflected by the WG-PBS 2.

Then, the reflective LCD device 1 polarizes and modulates the incident illumination light in accordance with image signals and then reflects the same light. The modulated light reflected by the LCD device 1 returns to the WG-PBS 2. In the modulated light, its S polarization component only is reflected by the WG-PBS 2, while its P polarization component is transmitted through the WG-PBS 2 to be a return light for the incident direction of the illumination light. Then, the modulated light reflected by the WG-PBS 2 is transmitted through an analyzer (e.g. a polarizing plate) 3 and then incident on a not-shown imaging lens system to project the light on a screen for imaging. Note that the analyzer 3 is arranged in order to eliminate unnecessary polarization components from image lights in respective colors reflected by the WG-PBS 2. Besides the polarization plate, a wire-grid polarization plate may be used for the analyzer 3.

In the reflective LCD device 1, by means of vapor-deposited coating, aligned films 14, 15 of $SiO_x$ compound are respectively formed on respective surface of the transparent substrate 11 and the active matrix substrate 12 on the side of the liquid crystal layer 13, applying predetermined alignment conditions on liquid crystal. For the liquid crystal layer 13, there is applied a nematic liquid crystal whose dielectric anisotropy is negative and whose double refraction index $\Delta n$ is 0.155 when the wavelength of light is 550 nm (green). Thus, reflective LCD device 1 is used in so-called "normally black mode".

In the following description, as shown in FIGS. 3 to 5B, an azimuth angle $\phi$ of a liquid crystal molecule in the alignment direction is represented as an angle of an azimuth (alignment) to a predetermined direction on the active matrix substrate 12. Here, this azimuth is obtained by projecting a vector, which coincides with the long axis of the liquid crystal molecule and points to a direction away from a boundary surface (i.e. surface of the active matrix substrate 12), on the principle surface of the active matrix substrate 12. Further, the predetermined direction on the active matrix substrate 12 is established so as to be a direction along one of projection lines obtained by projecting the wire grids 2a on the active matrix substrate 12 vertically. As another restriction about the predetermined direction, it should be noted that if it is turned in the counterclockwise direction by 90°, the direction (i.e. X-axis in figures) must point to a direction where one extension surface of the polarization spectroscopic surface intersects with another extension surface of the active matrix substrate 12.

The reference line vector of the reflective LCD device 1 is defined as follows. In the present invention, the reflective LCD device 1 is identical to either: a "normal-twist" type of vertically-aligned reflective LCD device where, in view from the transparent substrate 11, liquid crystal molecules on the side of the active matrix substrate 12 are aligned in the clockwise direction with respect to a reference line, and liquid crystal molecules on the side of the transparent substrate 11 are aligned in the counterclockwise direction with respect to the reference line; or a "reverse-twist" type of vertically-aligned reflective LCD device where, in view from the transparent substrate 11, liquid crystal molecules on the side of the active matrix substrate 12 are aligned in the counterclockwise direction with respect to the reference line and liquid crystal molecules on the side of the transparent substrate 11 are aligned in the clockwise direction with respect to the reference line.

Therefore, the reference line vector representing the above reference line in the form of vector will be defined as follows.

Figure 3:
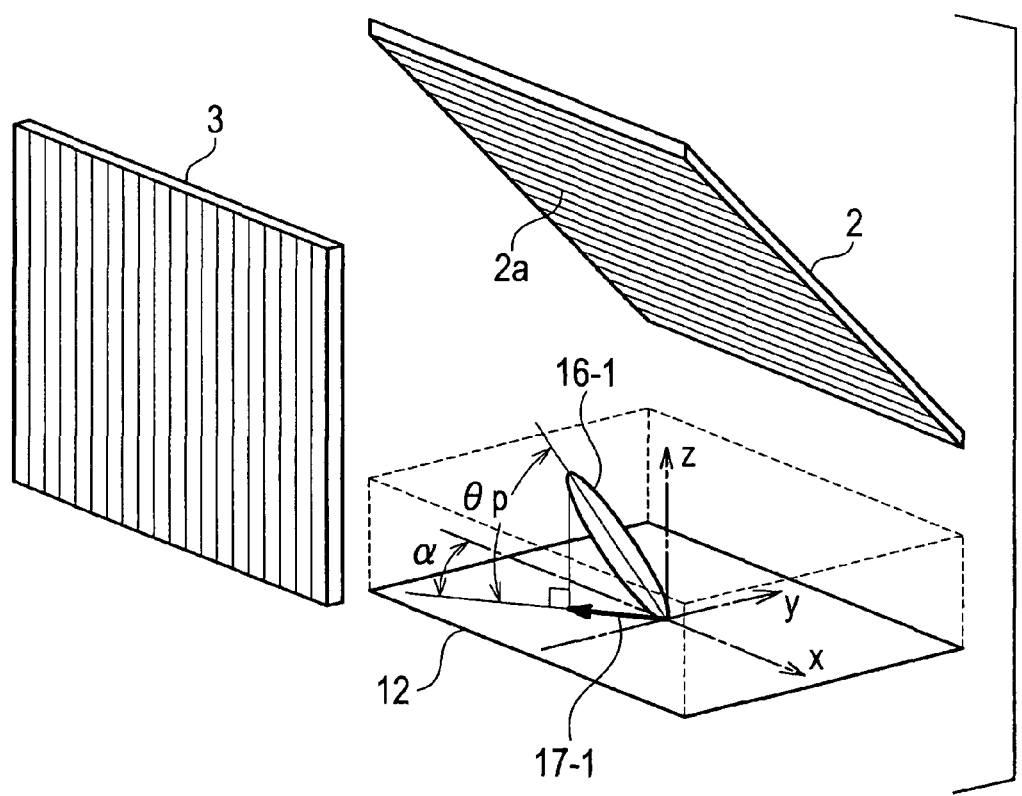
FIG. 3 is a pattern diagram showing the relationship between the liquid crystal alignment of a liquid crystal layer of the reflection type liquid crystal display device and WG-PBS, and also showing one projective line segment by 225° in the counterclockwise direction.
Figure 4:
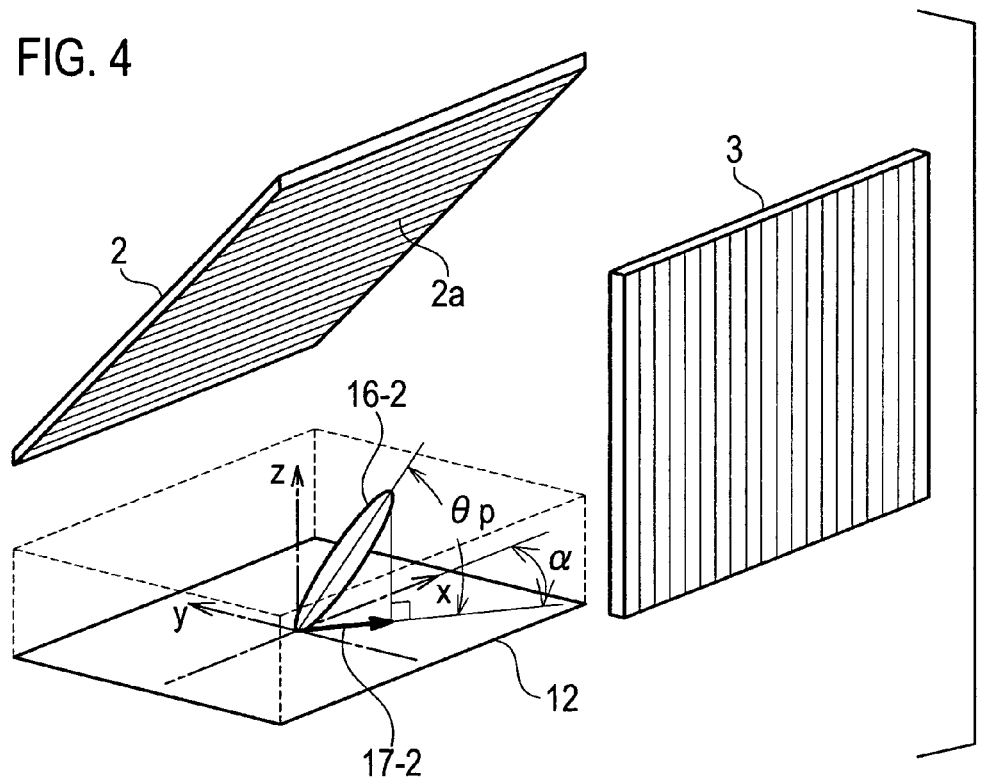
FIG. 4 is a pattern diagram showing the relationship between the liquid crystal alignment of the liquid crystal layer of the reflection type liquid crystal display device and WG-PBS, and also showing another projective line segment by 315 degrees in the counterclockwise direction.
Figure 5A:
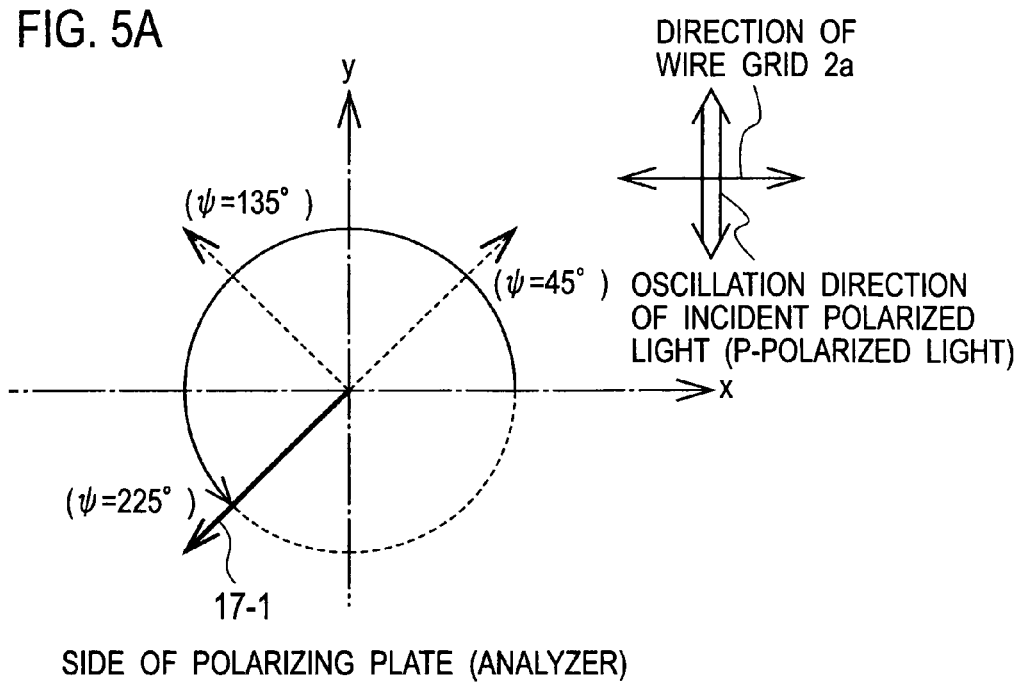
FIGS. 5A and 5B are views explaining the condition of liquid-crystal molecules alignment by representing the projective line segments of the liquid crystal molecules in the reflection type liquid crystal display device on an X-Y coordinate presumed on the side of an active matrix substrate ($\phi$=225°, 315°)
Figure 5B:
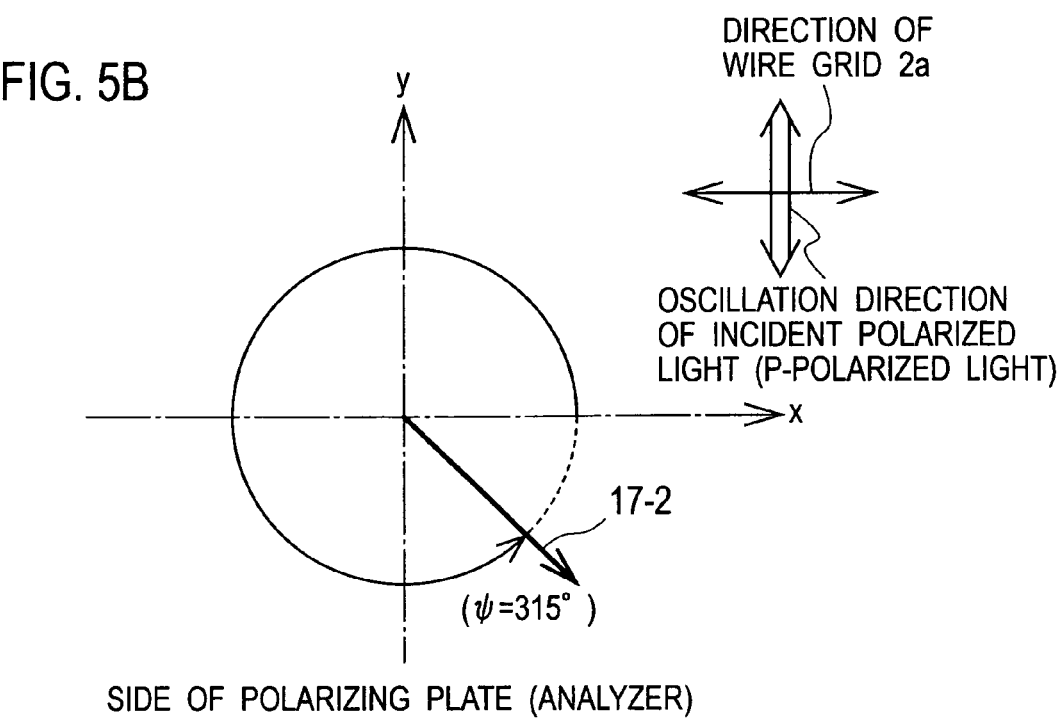

Here, the alignment of liquid crystal molecules on the side of the transparent substrate 11 is defined in the form of a unit vector whose direction corresponds to a direction of a vectorized projection line segment shown in FIG. 3 or FIG. 4 and whose length is equal to 1. The so-defined unit vector will be referred to as "unit vector on "CE" side", hereinafter.

Figure 16A:
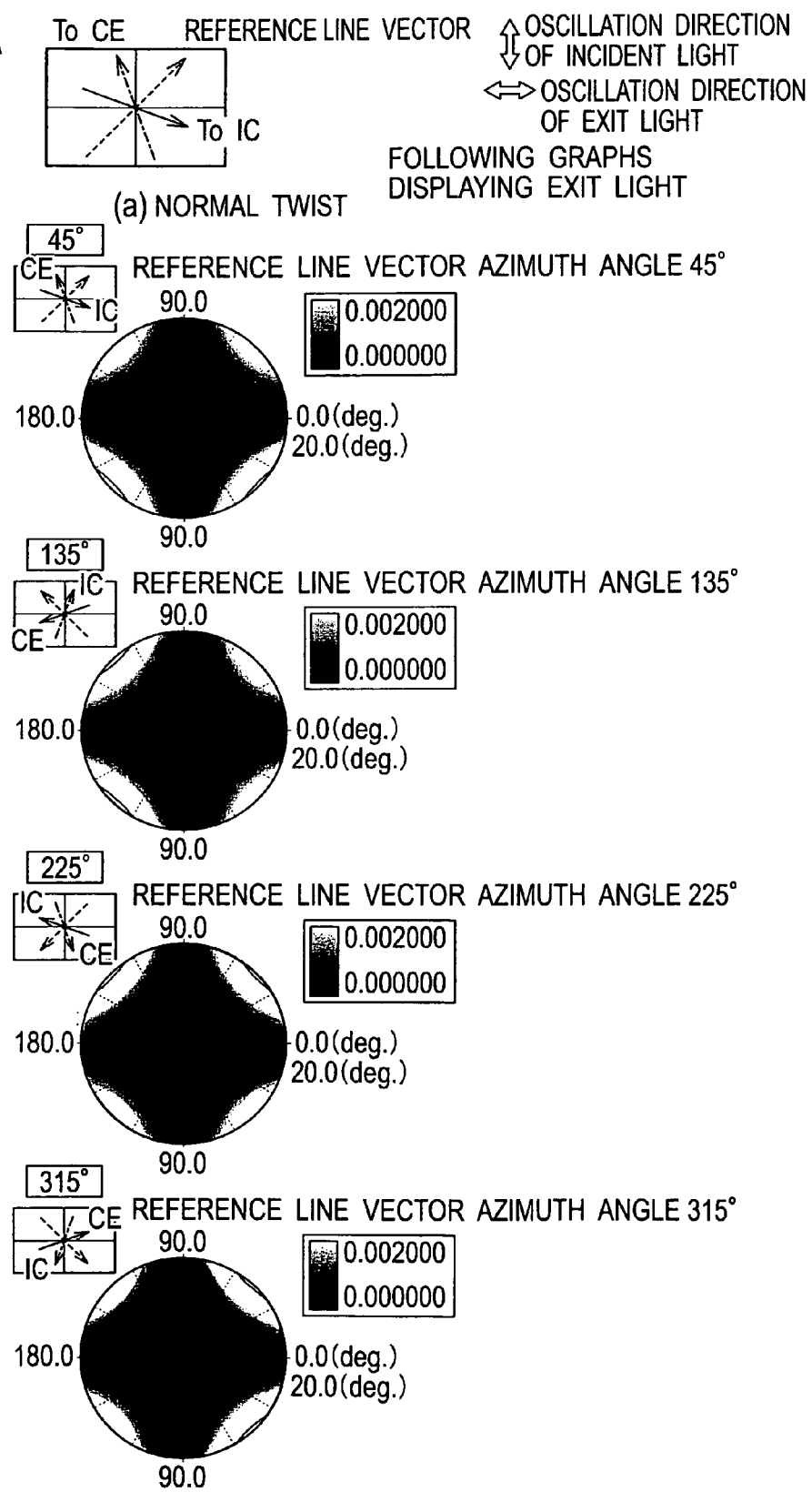

While, as shown in FIGS. 16A and 16B (top), the alignment of liquid crystal molecules on the side of the active matrix substrate 12 is defined in the form of a unit vector whose direction corresponds to a direction of a vectorized projection line segment and whose length is equal to 1. The so-defined unit vector will be referred to as "unit vector on "IC" side", hereinafter. Then, the reference lines vector is defined as a resultant vector from synthesizing the unit vector on "CE" side and the unit vector on "IC" side.

The reference line vector azimuth angle is defined as the angle between X-axis and the reference line vector in the counterclockwise direction from X-axis as a datum lime (0°).

The normal-twist type vertically-aligned reflection type liquid crystal display device means a device where the rotating direction from the active matrix substrate 12 to the transparent substrate 11 is the counterclockwise direction in view from the transparent substrate 11. In other words, the normal-twist type vertically-aligned reflection type liquid crystal display device is a liquid crystal device where it is established that, in view from the transparent substrate 11, liquid crystal molecules on the side of the active matrix substrate 12 are aligned in the clockwise direction with respect to the reference line vector, and liquid crystal molecules on the side of the transparent substrate 11 are aligned in the counterclockwise direction.

The reverse-twist type vertically-aligned reflection type liquid crystal display device means a device where the rotating direction from the active matrix substrate 12 to the transparent substrate 11 is the clockwise direction in view from the transparent substrate 11. In other words, the reverse-twist type vertically-aligned reflection type liquid crystal display device is a liquid crystal device where it is established that, in view from the transparent substrate 11, liquid crystal molecules on the side of the transparent substrate 11 are aligned in the clockwise direction with respect to the reference line vector, and liquid crystal molecules on the side of the active matrix substrate 12 are aligned in the counterclockwise direction.

1st. Embodiment

As for the monochromatic processing part of the projection type display device of the present invention, respective experiments of measuring an output of modulated light (S polarized light) through the analyzer 3 were performed. Through the experiments, both a normal-twist type reflective LCD device and a reverse-twist type reflective LCD device were used as the reflective LCD device 1.

As for the liquid crystal molecule, there are established $\theta p=82°$ in pre-tilt angle, d=2.6 μm in cell thickness and $\phi=120°$ in twist angle. As the liquid crystal, a liquid crystal having Δn=0.155 in refraction index is employed, provided that the wavelength of light is 550 nm (green). The twist angle $\phi$ is defined as an angle between both directions (i.e. liquid crystal alignment on the pixel side and liquid crystal alignment on the incident side) at an angle $\phi/2$ to the reference line in the clockwise and counterclockwise directions. Note that the reference line is at an angle of 45° to the vibrating direction of incident polarized light (P polarized light).

Figure 8A:
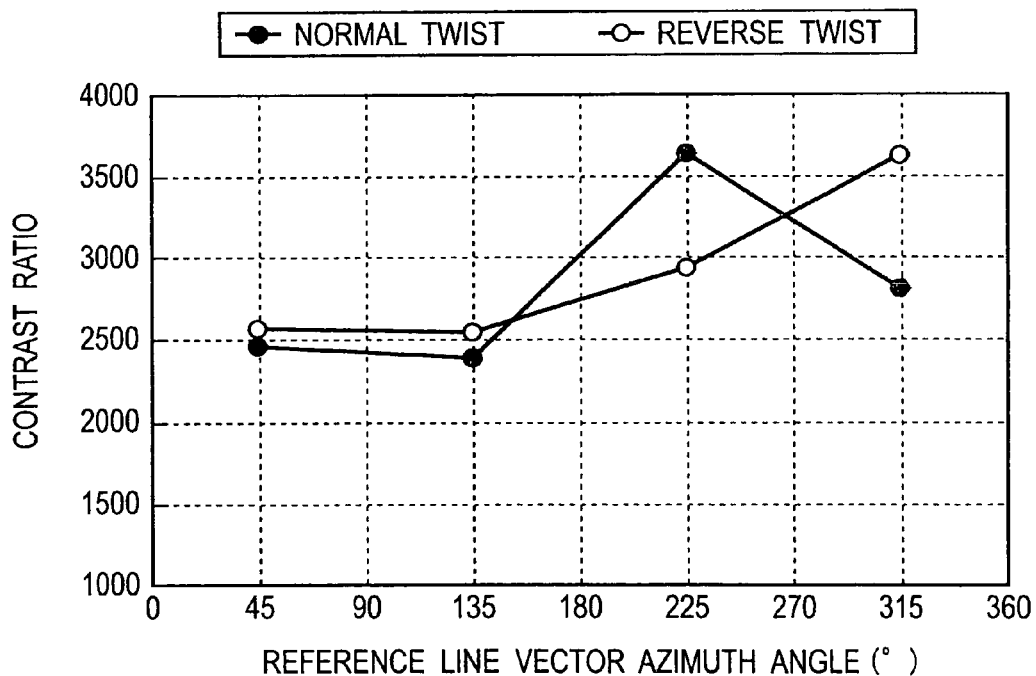
FIG. 8A is a diagram showing the relationship between contrast and reference line vector azimuth angle in case of using no phase compensating plate.

On condition of varying a voltage impressed between the transparent substrate 11 and all reflecting electrodes of the active matrix substrate 12 over a range of 0 to 5V with respect to respective lights in red, blue and green of the illumination light (respective center wavelengths: 620 nm, 450 nm, 550 nm), the light quantities of reflected lights (S polarized lights) at the WG-PBS 2 were measured. In addition, the brightness of black at an applied voltage 0V and the brightness of white at an applied voltage 5V were measured to calculate a ratio of the former brightness to the latter brightness. The measurement results are shown in FIG. 8A. FIG. 8A is a diagram showing the relationship between contrast and reference line vector azimuth angle in case of using no phase compensating plate.

Figure 8B:
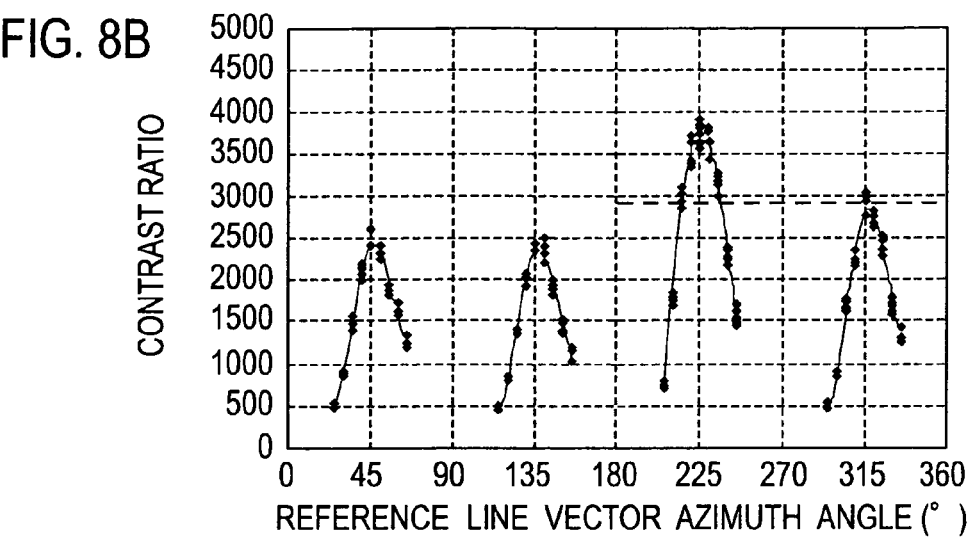
FIG. 8B is a diagram showing the relationship between contrast and reference line vector azimuth angle in case of using no phase compensating plate in the reflection type liquid crystal display device of normal twist type, in detail.
Figure 8C:
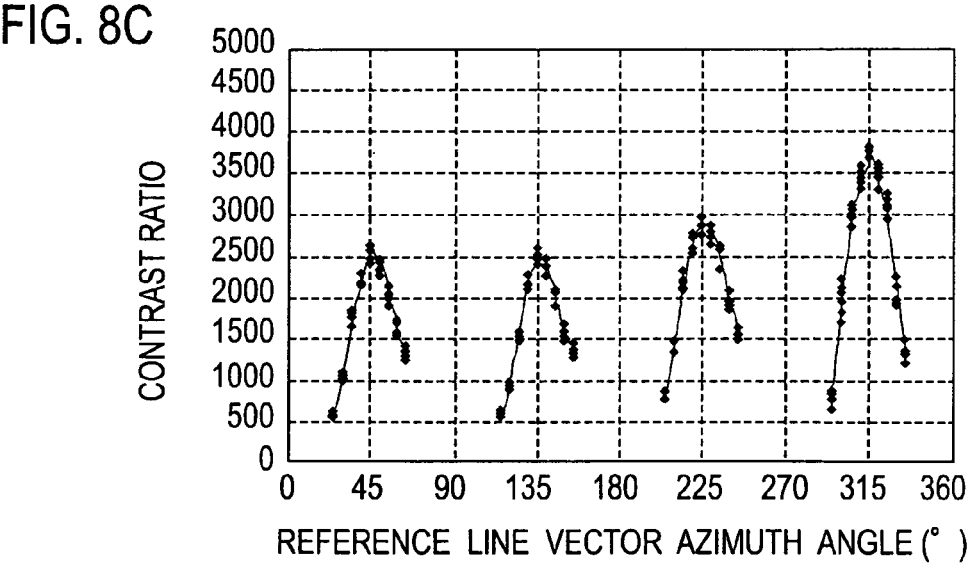
FIG. 8C is a diagram showing the relationship between contrast and reference line vector azimuth angle in case of using no phase compensating plate in the reflection type liquid crystal display device of reverse twist type, in detail.
Figure 8D:
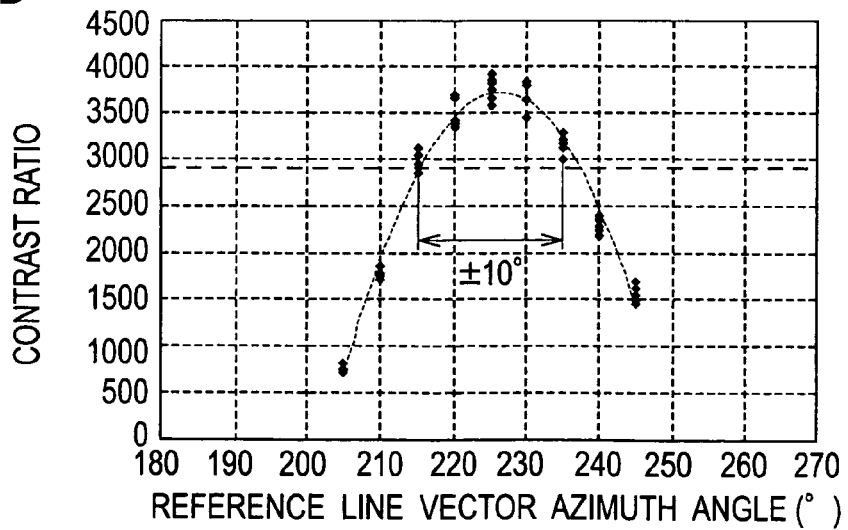
FIG. 8D is a diagram showing the relationship between contrast and reference line vector azimuth angle in vicinity of 225° in case of using no phase compensating plate in the reflection type liquid crystal display device of reverse twist type, in detail.

In the normal-twist type reflective LCD device, as shown in FIG. 8A, when the device's reference line vector is 225° in the counterclockwise direction, the contrast has a maximum value in comparison with respective contrasts at the other three angles (45°, 135°, 315°). In the reverse-twist type reflective LCD device, when the device's reference line vector is 315° in the counterclockwise direction, the contrast has a maximum value in comparison with respective contrasts at the other three angles (45°, 135°, 225°). In addition, as shown in FIGS. 8B to 8D, the reflective LCD devices can ensure high contrast ratios in the angular range of ±10°, respectively. Thus, there can be established an angular range of 225°±10° in the counterclockwise direction for the device's reference line vector in the normal-twist type reflective LCD device, and an angular range of 315°±10° in the counterclockwise direction for the device's reference line vector in the reverse-twist type reflective LCD device.

It is believed, in the projection type display device of the invention, the reason why the normal-twist type reflective LCD device differs from the reverse-twist type reflective LCD device in terms of behavior of contrast 1 is as follows.

Although the LCD device using vertically-aligned liquid crystal molecules provides high contrast against vertically-incoming light, the contrast deteriorates as the incident light is inclined. Thus, if using a lens having a small F-number, then it becomes difficult to provide high-contrast images as the merits of vertically-aligned liquid crystal molecules. Further, as the liquid crystal molecules in an initial state are generally arranged at a slant of a few degrees due to the application of a "pre-tilt" angle, the substantial inclination angle of the incident light gets larger moreover.

Therefore, a vertically-aligned reflective LCD device having a twist has been proposed. With the aim of providing a liquid crystal display device using vertically-aligned liquid crystal molecules accomplishing high contrast against obliquely-incoming light, the proposed reflective LCD device comprises a pair of substrates having electrodes on their opposed substrate surfaces and a liquid crystal layer enclosed between the substrates and containing vertically-aligned liquid crystal molecules whose pre-tilt direction is twisted between the substrates.

In this reflective LCD device, the degree of contrast varies depending on the situation of twist. Therefore, we now make a study on respective contrasts of a normal-twist type reflective LCD device and a reverse-twist type reflective LCD device.

In operation, an incident light from the light source enters a liquid crystal device through a polarizer and travels through the liquid crystal layer to the reflecting electrodes. Then, the incident light is reflected by the reflecting electrodes and subsequently emitted to the outside through the liquid crystal layer. Thus, by detecting this emission light through the analyzer by a detector, it is possible to measure a relationship between contrasts and azimuth angles (in-plane observation angles). Note that the polarizer and the analyzer are arranged so that their polarizing axes intersect with each other. Assuming an incident light having a large cone angle with the use of an optical system having small F-number, the incident angle (polar angle) is set to about 10 degrees. Beginning at an axis intersecting with the polarizing axis of the polarizer, it is desirable to rotate the azimuth angle from 0° up to 360° in a plane. That is, on condition of putting all of the light source, the polarizer, the analyzer and the detector in pile, the emission light is measured while rotating the azimuth angle against the reflective LCD device from 0° up to 360°.

Based on measurements obtained in this way, we now simulate the viewing angle characteristics of a normal-twist type reflective LCD device and a reverse-twist type reflective LCD device. Here, there are points to notice in performing a simulation corresponding to the optical system in the embodiments of the present invention. That is, according to the consideration of a reflective LCD device as a standard, if an azimuth angle changes, then the polarization angle of the incident light also changes with the azimuth angle. On the other hand, as for the direction dependency of a normal-twist type reflective LCD device and a reverse-twist type reflective LCD device in the present invention, it is noted that the direction of a polarization vector of the incident light is constant since the positions of a WG-PBS, an analyzer and a reflective LCD device forming an experimental device are fixed. Therefore, as shown in FIGS. 15B to 15E, the polarization direction of the incident angle is fixed constant, i.e. a polarization angle of the incident light transmitted through the WG-PBS irrespective of the azimuth angles.

As a result of the simulation, the normal-twist type vertically-aligned reflection type liquid crystal display device exhibits a different angular dependency from that of the reverse-twist type vertically-aligned reflection type liquid crystal display device, as shown in FIGS. 16A and 16B Accordingly, we exercised our ingenuity in improving the contrast in a measurement system in order to increase its detection sensitivity and thereafter, we again conducted the experimental tests for the normal-twist type reflective LCD device and the reverse-twist type reflective LCD device. Consequently, we found out the above-mentioned difference between the normal-twist type reflective LCD device and the reverse-twist type reflective LCD device, leading the present invention.

$2^{nd}$. Embodiment

Figure 7:
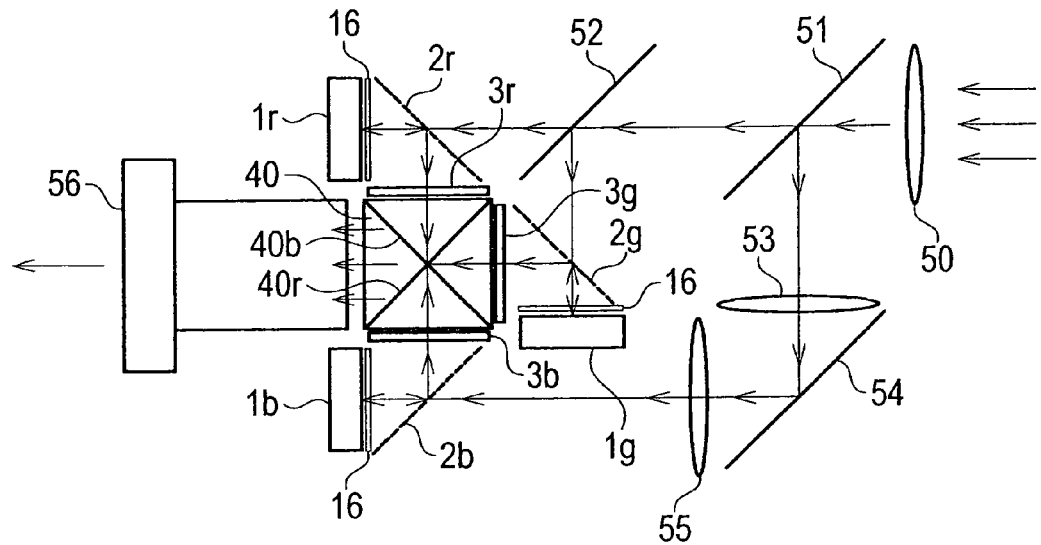
FIG. 7 is a plan view showing a projection type display device in accordance with the second embodiment of the present invention.

FIG. 7 is a plan view showing the constitution of the projection type display device in accordance with the second embodiment of the present invention.

As shown in FIG. 7, the projection type display device of the second embodiment is provided with three monochromatic processing parts (for red, blue and green) and color separating means for dissolving the illumination light from the light source into multicolor band components. In detail, this color separating means dissolves the illumination light from the light source into band components in three primary colors (R, B and G). The illumination light from the light source enters a first dichroic mirror 51 through a condenser lens 50. At the first dichroic mirror 51, a first color (R) component light and a third color (G) component light are transmitted therethrough, while a second color component (B) light is reflected by the mirror 51.

The second color (B) component of illumination light is transmitted through a condenser lens 53, a mirror 54 and a condenser lens 55 and then enters a reflective LCD device 1b for blue (i.e. the second reflection type liquid crystal device) through a WB-PBS 2b for blue. The first and third color (R and G) component of illumination lights enters a second dichroic mirror 52 through which the first color (R) component of illumination light is transmitted and by which the third color (G) component of illumination light is reflected. Then, the first color (R) component of illumination light enters a reflective LCD device 1r for red (i.e. the first reflection type liquid crystal device) through a WB-PBS 2r for red. The third color (G) component of illumination light enters a reflective LCD device 1g for green (i.e. the third reflection type liquid crystal device) through a WB-PBS 2g for green.

Then, modulated lights, which have been modulated in polarization and reflected by the reflective LCD devices 1r, 1b, 1g, are further reflected by the WG-PBS 2r, 2b, 2g. Being diverged from an optical path for the light source, the so-reflected modulated lights are then transmitted through corresponding analyzers 3r, 3b, 3g and enters photosynthetic means 40 for synthesizing the modulated lights in respective colors.

For example, the photosynthetic means 40 may be formed by a cross-dichroic prism where a first optical multilayer membrane 40r for reflecting only the light in the first color (e.g. red) of three primary colors selectively and transmitting the lights in the second and third colors (e.g. blue and green) and a second optical multilayer membrane 40b for reflecting only the light in the second color (blue) of three primary colors selectively and transmitting the lights in the first and third colors (red and green) are arranged so as to intersect with each other perpendicularly.

The red modulated light from the reflective LCD device 1r is reflected by the first optical multilayer membrane 40r of the photosynthetic means 40 and then enters an imaging lens system 56. The blue modulated light from the reflective LCD device 1b is reflected by the second optical multilayer membrane 40b of the photosynthetic means 40 and then enters the imaging lens system 56. The green modulated light from the reflective LCD device 1g is transmitted through the first and second optical multilayer membranes 40A, 40b of the photosynthetic means 40 and then enters the imaging lens system 56. In this way, the respective colors modulated lights synthesized by the photosynthetic means 40 enter the imaging lens system 56. This imaging lens system 56 forms an image of the modulated light synthesized by the photosynthetic means 40 on a not-shown screen for image displaying.

As for the reflective LCD device 1r, 1b, 1g of the projection type display device of the second embodiment, with the establishment of the reference line vector within the range of 225°±10° (in view from the transparent substrate 11) in the counterclockwise direction for the normal-twist type reflective LCD device and 315°±10° (in view from the transparent substrate 11) in the counterclockwise direction for the reverse-twist type reflective LCD device, the projection type display device is capable of displaying high-contrast images.

$3^{rd}$. Embodiment

Figures 9A, 9B:
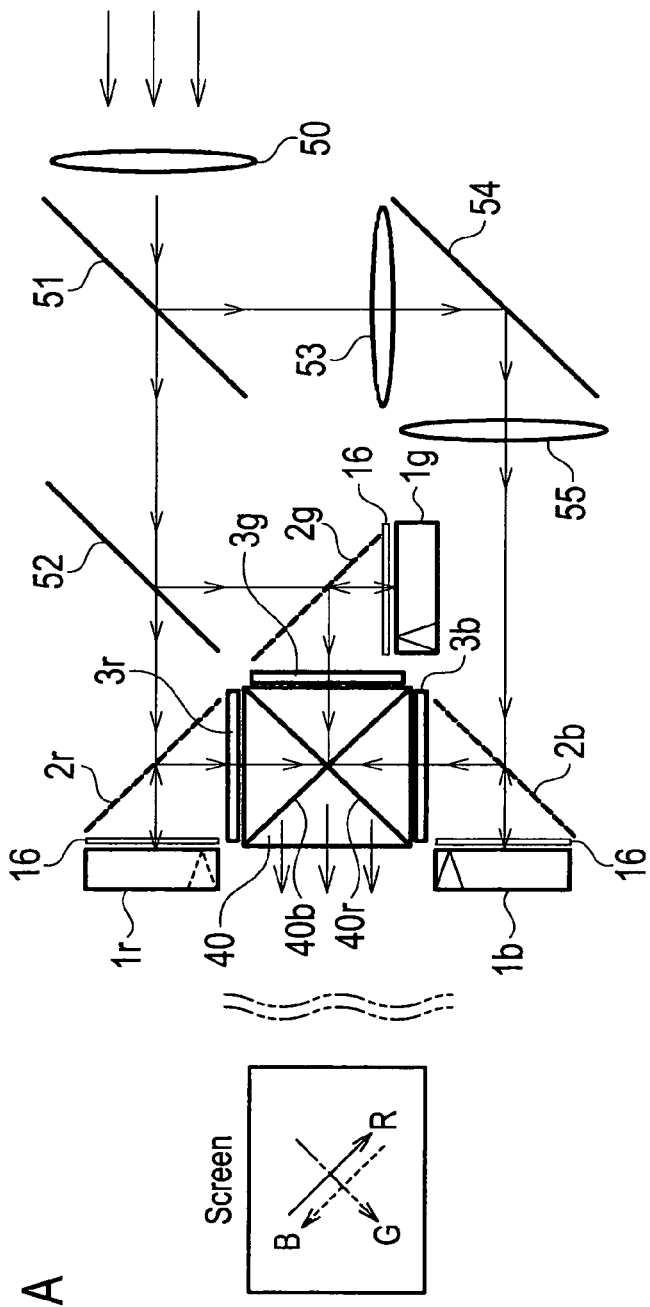
FIG. 9A is a plan view showing the projection type display device in accordance with the third embodiment of the present invention.
FIG. 9B is a diagram showing the liquid-crystal molecules alignment of the reflection type liquid crystal display device of the device of FIG. 9A.

FIGS. 9A and 9B show the projection type display device in accordance with the third embodiment of the present invention. FIG. 9A is a plan view showing the projection type display device of the third embodiment. FIG. 9B is a diagram showing the liquid-crystal molecules alignment of the device of FIG. 9A.

In this embodiment, as shown in FIG. 9B, all of the reflective LCD devices 1r, 1b, 1g comprise the normal-twist type reflective LCD devices. Thus, it is preferable that the reference line vectors of the reflective LCD devices 1r, 1b, 1g are set within the range of 225°±10° (in view from the transparent substrate 11) in the counterclockwise direction.

Figures 10A, 10B:
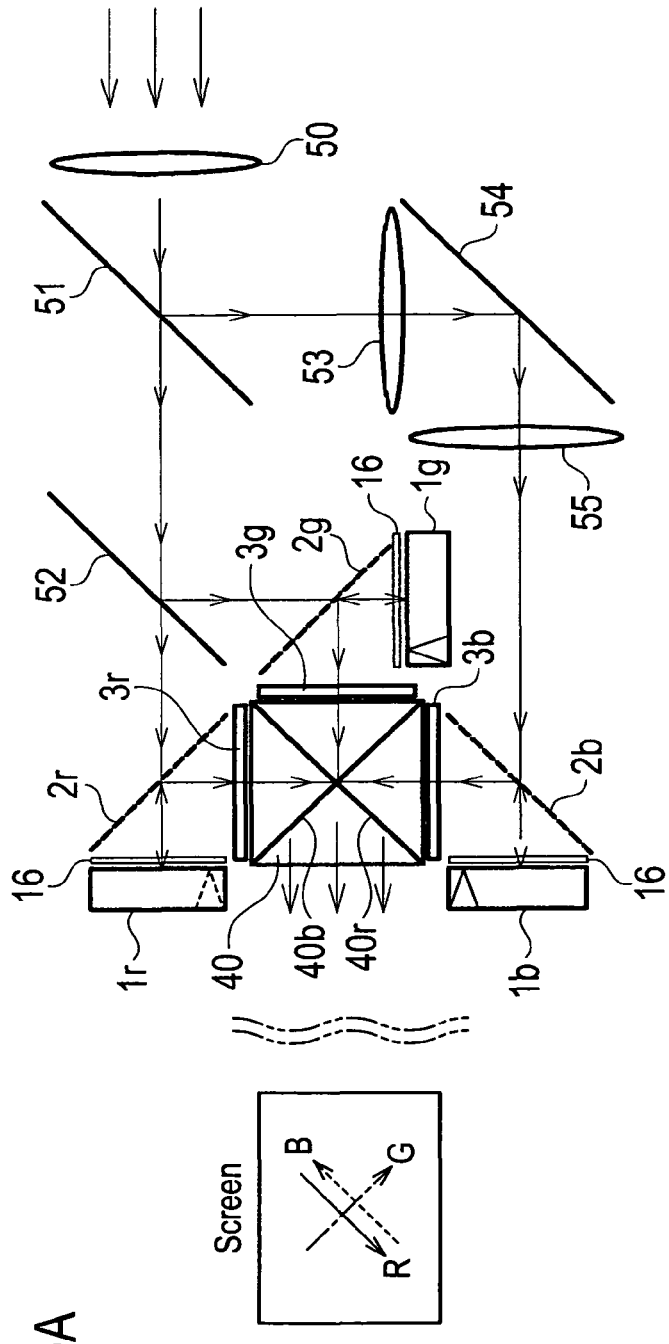
FIG. 10A is a plan view showing another example of the projection type display device in accordance with the third embodiment of the present invention.
FIG. 10B is a diagram showing the liquid-crystal molecules alignment of the reflection type liquid crystal display device of the device of FIG. 10A.

FIGS. 10A and 10B show another example of the projection type display device of the third embodiment of the present invention. FIG. 10A is a plan view of the projection type display device. FIG. 10B is a diagram showing the liquid-crystal molecules alignment of the device of FIG. 10A.

In this example, as shown in FIG. 10B, all of the reflective LCD devices 1r, 1b, 1g comprise the reverse-twist type reflective LCD devices. Thus, it is preferable that the reference line vectors of the reflective LCD devices 1r, 1b, 1g are set within the range of 315°±10° (in view from the transparent substrate 11) in the counterclockwise direction.

$4^{th}$. Embodiment

Figures 11A, 11B:
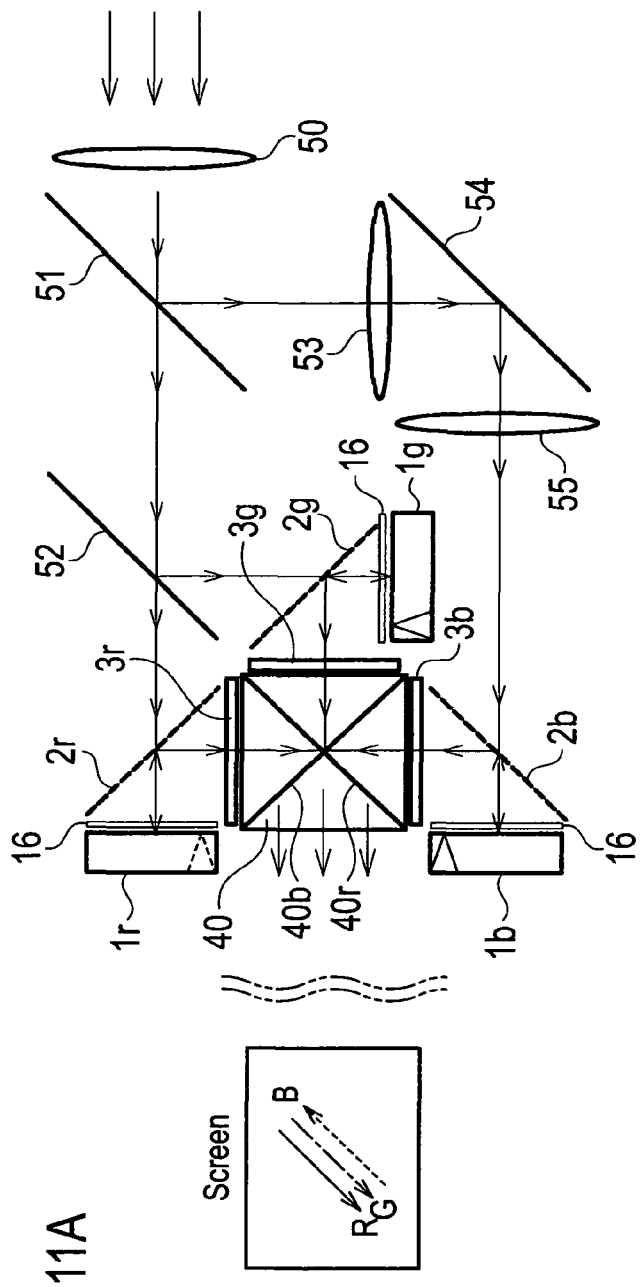
FIG. 11A is a plan view showing the projection type display device in accordance with the fourth embodiment of the present invention.
FIG. 11B is a diagram showing the liquid-crystal molecules alignment of the reflection type liquid crystal display device of the device of FIG. 11A.

FIGS. 11A and 11B show the projection type display device in accordance with the fourth embodiment of the present invention. FIG. 11A is a plan view showing the projection type display device of the fourth embodiment. FIG. 11B is a diagram showing the liquid-crystal molecules alignment of the device of FIG. 11A.

Also in the reflective LCD device 1r, 1b, 1g of the projection type display device of the fourth embodiment, with the establishment of the reference line vector within the range of 225°±10° (in view from the transparent substrate 11) in the counterclockwise direction for the normal-twist type reflective LCD device and 315°±10° (in view from the transparent substrate 11) in the counterclockwise direction for the reverse-twist type reflective LCD device, the projection type display device is capable of displaying high-contrast images.

This projection type display device includes the reverse-twist type reflective LCD device 1r (for red) allowing an incidence of illumination light in red (first color), the reverse-twist type reflective LCD device 1b (for blue) allowing an incidence of illumination light in blue (second color) and the normal-twist type reflective LCD device 1g (for green) allowing an incidence of illumination light in green (third color).

The reverse-twist type reflective LCD device 1r for red has its reference line vector positioned at 315°±10° in the counterclockwise direction in view from the transparent substrate 11. The reverse-twist type reflective LCD device 1b for blue has its reference line vector positioned at 315°±10° in the counterclockwise direction in view from the transparent substrate 11. While, the normal-twist type reflective LCD device 1g for green has its reference line vector positioned at 225°±10° in the counterclockwise direction in view from the transparent substrate 11.

In this projection type display device, the reflective LCD devices 1r, 1b, 1g for respective colors are under their optimum conditions in terms of contrast. In addition, in common with the reflective LCD devices for red and green, on a synthesized screen consisting of red and green, the alignment direction of liquid crystal molecules on the side of the transparent substrate 11 (i.e. a direction of a unit vector on the CE side) coincides with the alignment direction of liquid crystal molecules on the side of the active matrix substrate 12 (i.e. a direction of a unit vector on the IC side). Note that, in FIGS. 9B to 14B, the former alignment direction will be simply represented by "CE" while the latter alignment direction will be simply represented by "IC".

Thus, this projection type display device is also capable of displaying high-contrast images where failure of disclination is improved remarkably.

Here, as the reflective LCD device 1b for blue has less influence on disclination generally, it may be formed by a normal-twist type device whose reference line vector is within the range of 225°±10°.

Figure 12A:
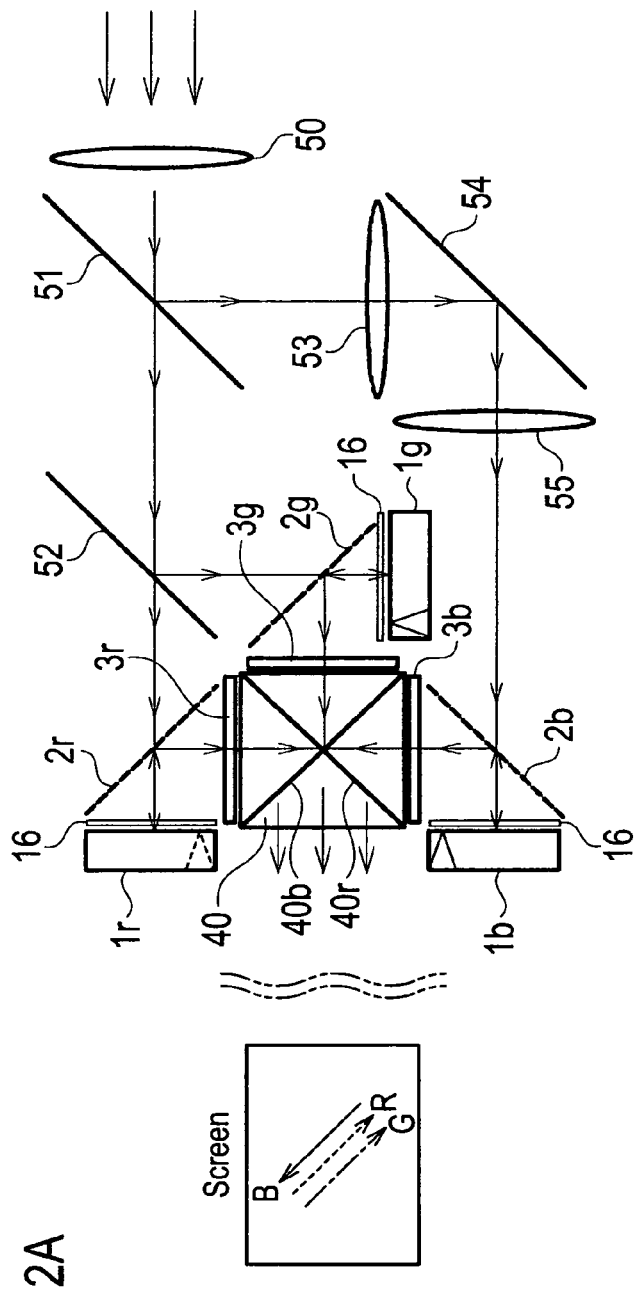
FIG. 12A is a plan view showing another example of the projection type display device in accordance with the fourth embodiment of the present invention.
Figure 12B:
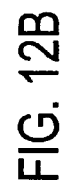
FIG. 12B is a diagram showing the liquid-crystal molecules alignment of the reflection type liquid crystal display device of the device of FIG. 12A.

FIGS. 12A and 12B show another example of the projection type display device of the fourth embodiment of the present invention. FIG. 12A is a plan view of the projection type display device. FIG. 12B is a diagram showing the liquid-crystal molecules alignment of the device of FIG. 12A.

This projection type display device includes the normal-twist type reflective LCD device 1r (for red) allowing an incidence of illumination light in red (first color), the normal-twist type reflective LCD device 1b (for blue) allowing an incidence of illumination light in blue (second color) and the reverse-twist type reflective LCD device 1g (for green) allowing an incidence of illumination light in green (third color).

The normal-twist type reflective LCD device 1r for red has its reference line vector positioned at 225°±10° in the counterclockwise direction in view from the transparent substrate 11. The normal-twist type reflective LCD device 1b for blue has its reference line vector positioned at 225°±10° in the counterclockwise direction in view from the transparent substrate 11. While, the reverse-twist type reflective LCD device 1g for green has its reference line vector positioned at 315°±10° in the counterclockwise direction in view from the transparent substrate 11.

Also in this projection type display device, the reflective LCD devices 1r, 1b, 1g for respective colors are under their optimum conditions in terms of contrast. In addition, in common with the reflective LCD devices for red and green, on a synthesized screen consisting of red and green, the alignment direction of liquid crystal molecules on the side of the transparent substrate 11 (direction of a unit vector on the CE side) coincides with the alignment direction of liquid crystal molecules on the side of the active matrix substrate 12 (direction of a unit vector on the IC side).

Thus, this projection type display device is also capable of displaying high-contrast images where failure of disclination is improved remarkably.

Here, as the reflective LCD device 1b for blue is generally subjected to less influence of disclination, it may be formed by a reverse-twist type reflective LCD device whose reference line vector is within the range of 315°±10° in the counterclockwise direction in view from the transparent substrate 11.

5$^{th}$. Embodiment

Figures 13A, 13B:
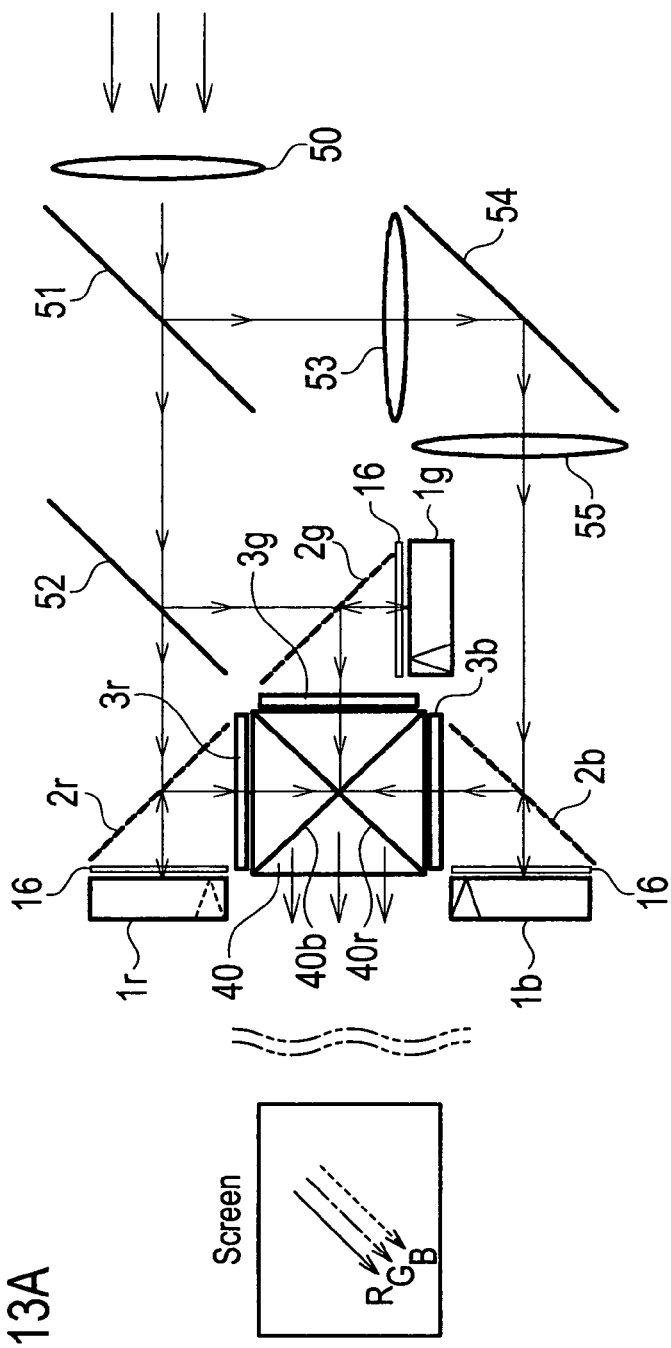
FIG. 13A is a plan view showing the projection type display device in accordance with the fifth embodiment of the present invention.
FIG. 13B is a diagram showing the liquid-crystal molecules alignment of the reflection type liquid crystal display device of the device of FIG. 13A.

FIGS. 13A and 13B show the projection type display device in accordance with the fifth embodiment of the present invention. FIG. 13A is a plan view showing the projection type display device of the fifth embodiment. FIG. 13B is a diagram showing the liquid-crystal molecules alignment of the device of FIG. 13A.

This projection type display device includes the reverse-twist type reflective LCD device 1r (for red) allowing an incidence of illumination light in red (first color), the reverse-twist type reflective LCD device 1b (for blue) allowing an incidence of illumination light in blue (second color) and the normal-twist type reflective LCD device 1g (for green) allowing an incidence of illumination light in green (third color).

The reverse-twist type reflective LCD device 1r for red has its reference line vector positioned at 315°±10° in the counterclockwise direction in view from the transparent substrate 11. The reverse-twist type reflective LCD device 1b for blue has its reference line vector positioned at 135°±10° in the counterclockwise direction in view from the transparent substrate 11. The normal-twist type reflective LCD device 1g for green has its reference line vector positioned at 225°±10° in the counterclockwise direction in view from the transparent substrate 11.

Figures 14A, 14B:
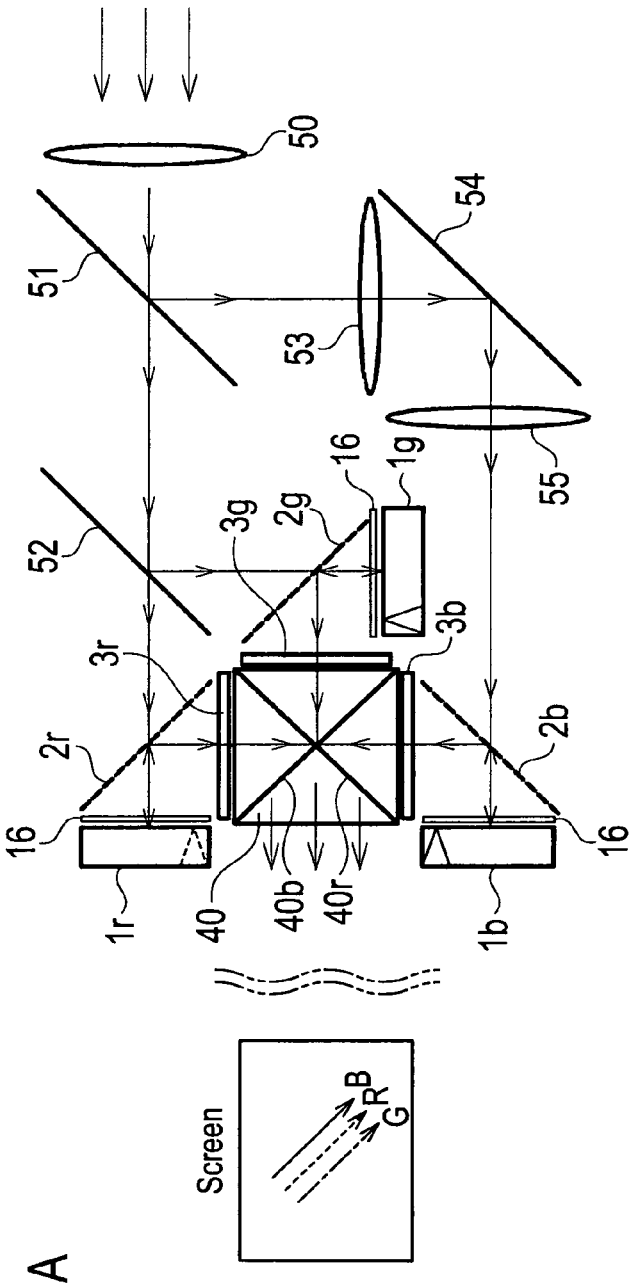
FIG. 14A is a plan view showing another example of the projection type display device in accordance with the fifth embodiment of the present invention.
FIG. 14B is a diagram showing the liquid-crystal molecules alignment of the reflection type liquid crystal display device of the device of FIG. 12A.
Figure 15A:
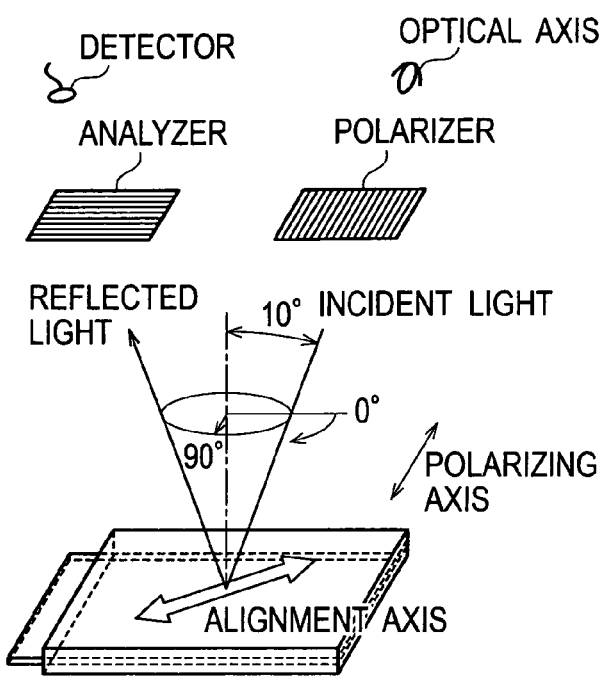
FIGS. 15A to 15E are perspective views explaining a method of measuring contrast of the reflection type liquid crystal display device.
Figure 15B:
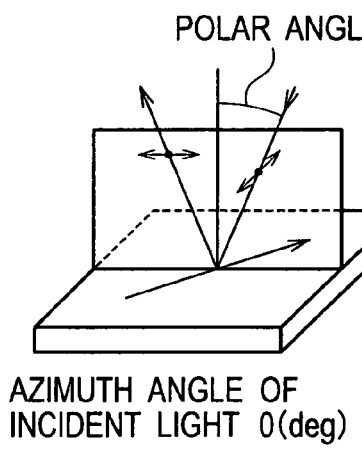
Figure 15C:
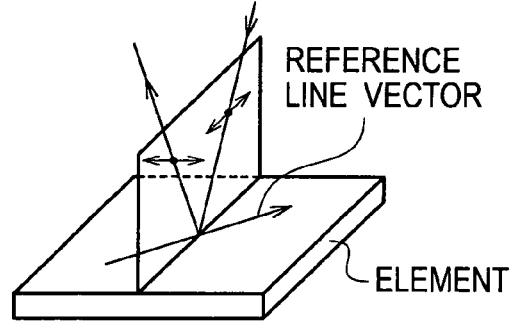
Figure 15D:
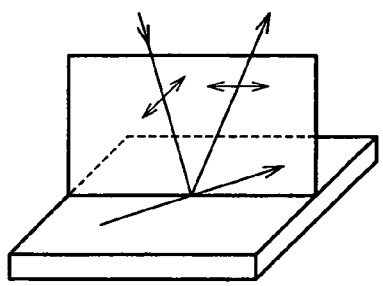
Figure 15E:
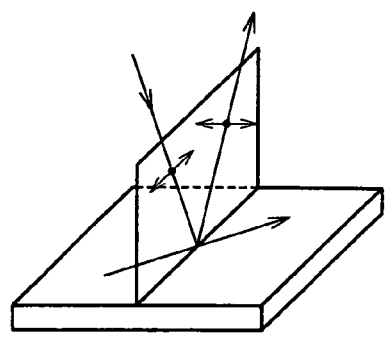

FIGS. 14A and 14B show another example of the projection type display device of the fifth embodiment of the present invention. FIG. 14A is a plan view of the projection type display device. FIG. 14B is a diagram showing the liquid-crystal molecules alignment of the device of FIG. 14A.

This projection type display device includes the normal-twist type reflective LCD device 1r (for red) allowing an incidence of illumination light in red (first color), the normal-twist type reflective LCD device 1b (for blue) allowing an incidence of illumination light in blue (second color) and the reverse-twist type reflective LCD device 1g (for green) allowing an incidence of illumination light in green (third color).

The normal-twist type reflective LCD device 1r for red has its reference line vector positioned at 225°±10° in the counterclockwise direction in view from the transparent substrate 11. The normal-twist type reflective LCD device 1b for blue has its reference line vector positioned at 45° in the counterclockwise direction in view from the transparent substrate 11. The reverse-twist type reflective LCD device 1g for green has its reference line vector positioned at 315°±10° in the counterclockwise direction in view from the transparent substrate 11.

In this projection type display device, as for each of red, blue and green, the alignment direction of liquid crystal molecules on the side of the transparent substrate 11 (direction of a unit vector on the CE side) coincides with the alignment direction of liquid crystal molecules on the side of the active matrix substrate 12 (direction of a unit vector on the IC side) on a synthesized screen consisting of red, blue and green.

That is, as the degree of contribution of blue on the contrast in the screen is the least of the three colors although the reflective LCD device for blue is not under the optimum condition in terms of contrast, this projection type display device can display images eliminating the failure of disclination substantially completely while holding the deterioration of contrast in the whole screen to a minimum.

Although the above-mentioned embodiments adopt the twist angle ☐ of liquid crystal layer of 120° and the cell thickness of 2.6 µm in common, the twist angle ☐ may be changed within the range of 110° to 130°.

For instance, in case of the wavelength λ of illumination light of 550 nm, a liquid crystal having the refraction index Δn=0.132 and its molecules having the pre-tilt angle θp=82° was adopted as the liquid crystal. Further, while changing the twist angle in the range of 100° to 150° and the cell thickness d (as a parameter) in the range of 2.6 µm to 4.0 µm, the brightness of black at 0V in applied voltage and the brightness of white at 5V in applied voltage were together measured to calculate a ratio therebetween. As a result, it is found that the brightness of black has always a minimum value at the twist angle φ=120° irrespective of the cell thickness d, and there can be attained a relatively favorable black level in the range of 110° to 130° in twist angle. In addition, when the cell thickness d is less than 2.6 µm, the brightness of white is reduced to cause a deterioration of contrast. When the cell thickness d is more than 4.0 µm, the image quality is lowered due to reduced liquid crystal's response speed and increased disclination.

In addition, in case of the wavelength λ of illumination light of 550 nm, a liquid crystal having the refraction index Δn=0.085 and its molecules having the pre-tilt angle θp=82° was adopted as the liquid crystal. Further, while changing the twist angle in the range of 100° to 150° and the cell thickness d (as a parameter) every 0.2 µm in the range of 1 µm to 2.6 µm, the brightness of black at 0V in applied voltage and the brightness of white at 5V in applied voltage were together measured to calculate a ratio therebetween. As a result, it is found that the brightness of black has always a minimum value at the twist angle φ=120° irrespective of the cell thickness d, and there can be attained a relatively favorable black level in the range of 110° to 130° in twist angle. In addition, when the cell thickness d is less than 1 µm, the brightness of white is reduced to cause a deterioration of contrast. When the cell thickness d is more than 2.6 µm, the image quality is lowered due to reduced liquid crystal's response speed and increased disclination.

From the above result, without being limited to 2.6 µm only, the cell thickness may be available within the range of 1 µm to 4 µm, more preferably, 1.4 µm to 3.5 µm.

[Re. Disclination]

In the fourth embodiment, on a synthesized screen consisting of two colors, the alignment direction of liquid crystal molecules on the side of the transparent substrate 11 (direction of a unit vector on the CE side) coincides with the alignment direction of liquid crystal molecules on the side of the active matrix substrate 12 (direction of a unit vector on the IC side).

In the fifth embodiment, on a synthesized screen consisting of three colors, the alignment direction of liquid crystal molecules on the side of the transparent substrate 11 (direction of a unit vector on the CE side) coincides with the alignment direction of liquid crystal molecules on the side of the active matrix substrate 12 (direction of a unit vector on the IC side).

We now discuss a disclination in the projection type display device of the present invention.

In general discussion, the vertically-aligned liquid crystal has a problem of disclination although it is advantageous in contrast. This disclination indicates a situation that uniform displaying cannot be attained by randomly-produced discontinuous portions (i.e. disclination) in alignment because liquid crystal molecules, which have been merely vertically-aligned between the parallel substrates, are tilted in various directions by applying an electrical voltage. In order to alleviate such a phenomenon, there has been adopted a method of arranging liquid crystal molecules at a pre-tilt angle to the completely-vertical alignment, in advance.

It was believed that in a trichromatic screen where red, blue and green colors are integrated, if only aligning respective directions of projective line segments produced by projecting long axes of liquid crystal molecules on the active matrix substrate, the failure of disclination could be solved. In the above-mentioned vertically-aligned reflective LCD device having a twist, however, even if aligning respective reference line vectors of the reflective LCD device devices for respective colors on a screen, the failure of disclination could not be completely solved to produce an inadequate situation in displaying superior images.

Meanwhile, in the present invention, the above-mentioned liquid-crystal alignment condition is imposed on respective liquid crystal molecules in the reflective LCD device. Due to the difference in surface condition between the transparent substrate 11 and the active matrix substrate 12, there are required alignment conditions suitable to these substrates respectively. For this reason, the restraining forces for orienting liquid crystal molecules are not identical to each other in the vicinity of the opposed substrates and furthermore, the pre-tilt angles of molecules in the vicinity of the transparent substrate 11 are frequently different from those in the vicinity of the active matrix substrate 12.

It is note that the occurrence direction of disclination intercorrelates with the tilt alignment of each liquid crystal molecule, so that the amount of occurrence comes under the great influence of a pre-tilt angle imposed. Although the characteristics of high contrast is accomplished by twisting the vertically-aligned liquid crystal molecules between the transparent substrate 11 and the active matrix substrate 12 in the present invention, the twisting of liquid crystal moles becomes asymmetrical to the reference axis so long as the above-mentioned difference in terms of the restraining force and the pre-tilt angle are present between the transparent substrate 11 and the active matrix substrate 12.

Due to this asymmetric nature in liquid crystal cells, it also results in differences in the occurrence of disclination. For instance, if the alignment direction of liquid crystal molecules on the side of the active matrix substrate 12 (i.e. a direction of a unit vector on the IC side) coincides with X-axis while the alignment direction of liquid crystal molecules on the side of the transparent 11 (i.e. a direction of a unit vector on the CE side) coincides with Y-axis, there is produced a difference between the occurrence amount of disclination in the direction of X-axis of pixels and the occurrence amount of disclination in the direction of Y-axis of pixels.

Figure 6A:
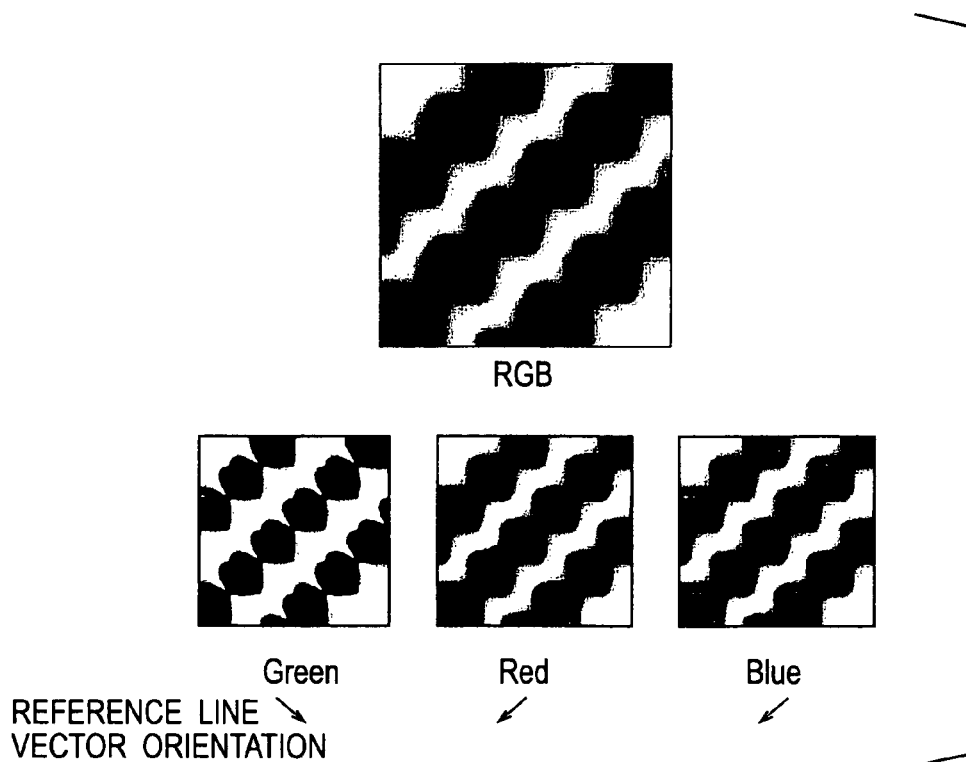
FIG. 6A is an enlarged view of an example of full-color displaying when disclinations occurring in the reflection type liquid crystal display device (due to a voltage difference between adjacent pixels in the active matrix substrate) are different from each other in respective R, G, B colors.

If the alignment directions on the side of the active matrix substrate 12 and the transparent substrate 11 are not aligned with each other onto a projection screen with respect to each of red, blue and green, the above-mentioned difference in the occurrence amount of disclination causes coloring shown in FIG. 6A to be produced in displaying black slanted lines on a background in white.

On the contrary, according to the fourth and fifth embodiments of the present invention, as the alignment direction of liquid crystal molecules on the side of the active matrix substrate 12 (i.e. a direction of a unit vector on the IC side) coincides with the alignment direction of liquid crystal molecules on the side of the transparent 11 (i.e. a direction of a unit vector on the CE side) on a synthesized screen in two colors, particularly in the fifth embodiment, with respect to each of red, blue and green, it is possible to eliminate the failure of coloring due to disclination generally completely, as shown in FIG. 6B.

Meanwhile, a phase compensating plate 16 as a phase compensator may be inserted between the WG-PBS 2 and the reflective LCD device 1 as the occasion demands. For example, a plate where the refraction index nz in the direction of film thickness is smaller than the refraction index nx=ny in the in-plane direction can be used as the phase compensating plate 16 (e.g. nx=ny=1.5225, nz=1.51586). Such a phase compensating plate is a so-called "C plate" where the refraction index in the film-thickness direction perpendicular to the surface of the phase compensating plate 16 is set less than the refraction index in the in-plane direction. Assuming the principle orthogonally-crossed refraction indexes in a plane are represented by nx, ny and the principle refraction index in the film-thickness direction is represented by nz, the above C plate is defined as a phase compensating plate satisfying a condition of nx=ny≧nz.

In the projection type display devices shown in FIGS. 9A to 14A, similarly, the above-mentioned phase compensating plate 16 may be arranged in each of the monochromic processing parts for respective colors as the occasion demands. That is, owing to the arrangement of the phase compensating plates 16 for respective colors between the reflective LCD devices 1r, 1b, 1g for respective colors and the WG-PBS 2r, 2b, 2g, the contrast of display images can be improved furthermore.

These phase compensating plates 16 have respective refraction indexes in the film-thickness direction less than the refraction indexes in the in-plane direction and are formed as so-called "C plates". As mentioned above, assuming the principle orthogonally-crossed refraction indexes in a plane are represented by nx, ny and the principle refraction index in the film-thickness direction is represented by nz, each of the C plates is defined as a phase compensating plate satisfying a condition of nx=ny≧nz. In connection, it should be noted that the quality of "nx=ny" means that a value of nx is substantially equal to a value of ny due to the presence of some fluctuations (error).

In order to compensate phase differences suitable to respective bands of wavelength, the phase compensating plates 16 for respective colors have phase differences imparted preliminarily. Thus, an antireflection coating is applied on a boundary between the phase compensating plate 16 for each color and air (i.e. one surface of the plate 16) to reduce the reflection light as possible.

When inserting the C plate, it is desirable that a retardation Δn·d (i.e. a product between a double refraction Δn of liquid crystal and cell thickness d, produced when light is transmitted through the liquid crystal layer 13 having a cell thickness d) is less than 0.5 nm. Further, the optical output have a minimum at a twist angle φ=120° irrespective of the double refraction index Δn and the cell thickness d.

Figure 17:
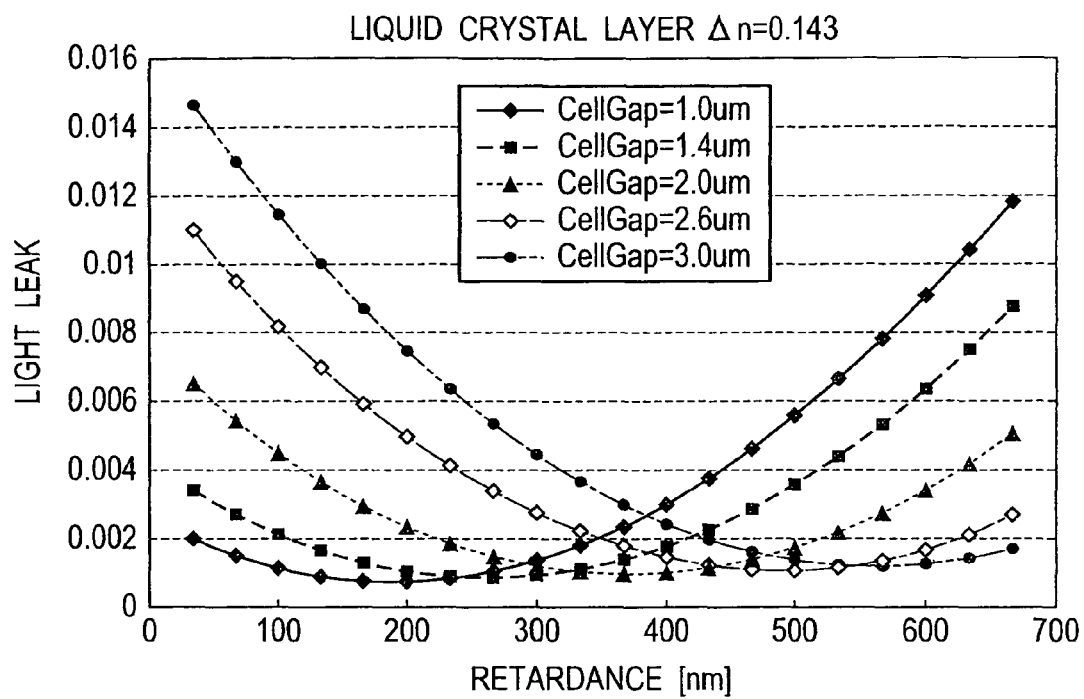
FIG. 17 is a diagram showing the relationship between retardance in the phase compensating plate and light leak under condition of varying retardation in the reflection type liquid crystal display device.

As for the phase difference (retardance) of the phase compensating plate 16, on the contrary, its value at which light leak can have a minimum value changes depending on the retardation Δn·d, that is, the double refraction index Δn and the cell thickness d, as shown in FIG. 17. FIG. 17 is a diagram showing the relationship between the phase difference Rth at the phase compensating plate 16 and the light leak as a result of changing the retardation Δn·d with the cell thickness d as a parameter under condition of setting the corn angle of 12° with the use of the liquid crystal having a double refraction index Δn=0.143.

Figure 18:
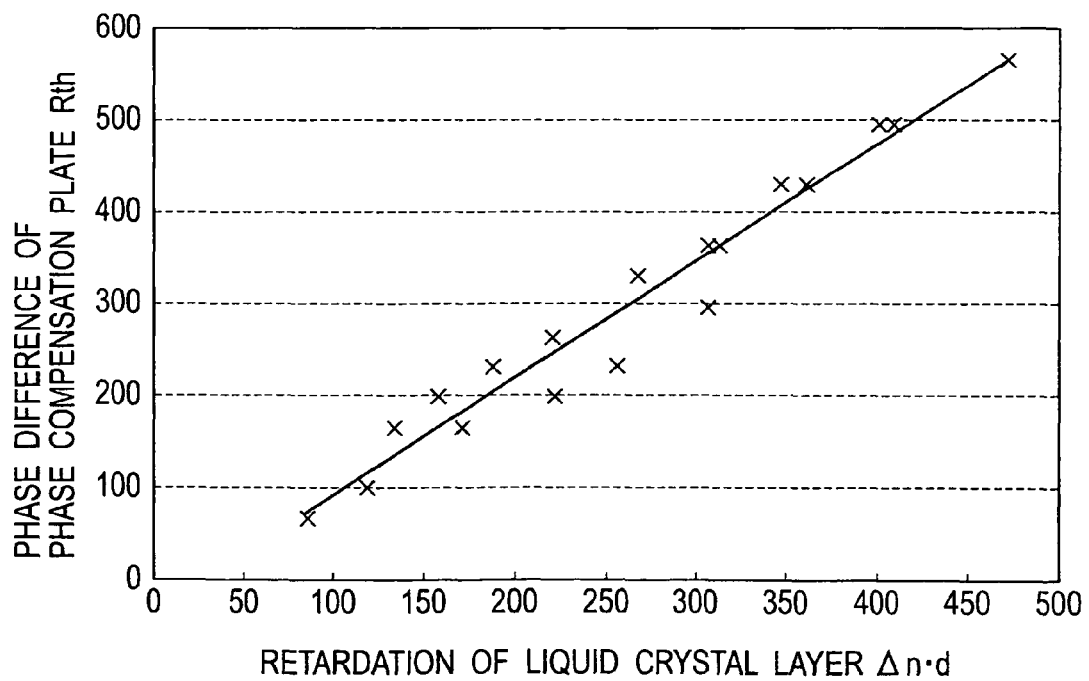
FIG. 18 is a diagram showing the relationship between retardance of the phase compensating plate taking a minimum value of each line of FIG. 17 and retardation of the liquid crystal layer.

When representing the phase difference (retardance) of the phase compensating plate 16 occupying minimum values of respective curves by Rth, the relationship between the retardation Δn·d of the liquid crystal layer 13 and the phase difference Rth of the compensating plate 16 is as shown in FIG. 18. That is, when the retardation Δn·d is equal to 200 nm, the optimum phase difference Rth of the phase compensating plate 16 becomes 179 nm. Again, when the retardation Δn·d is equal to 500 nm, the optimum phase difference Rth of the phase compensating plate 16 becomes 445 nm. In fact, however, there is great variability in the characteristics of the liquid crystal layer 13 and the phase compensating plate 16 in an actual system. Therefore, when the retardation Δn·d is in the range from 200 nm to 500 nm, the optimum phase difference Rth of the phase compensating plate 16 has to have a value from about 150 nm to about 500 nm. Further, when the retardation Δn·d is in the range from 300 nm to 400 nm, the optimum phase difference Rth of the phase compensating plate 16 becomes a value from about 250 nm to about 400 nm.

In detail, for instance, if the liquid layer 13 has its refraction index Δn=0.143 and a thickness of 1.4 μm, then retardation Δn·d becomes 200 nm and the phase difference Rth of the optimum phase compensating plate 16 becomes about 179 nm. Again, if the liquid layer 13 has its refraction index Δn=0.143 and a thickness of 2.1 μm, then retardation Δn·d becomes 300 nm and the phase difference Rth of the optimum phase compensating plate 16 becomes about 226 nm. Further, if the liquid layer 13 has its refraction index Δn=0.143 and a thickness of 2.44 μm, then retardation Δn·d becomes 350 nm and the phase difference Rth of the optimum phase compensating plate 16 becomes about 312 nm. Still further, if the liquid layer 13 has its refraction index Δn=0.143 and a thickness of 2.79 μm, then retardation Δn·d becomes 400 nm and the phase difference Rth of the optimum phase compensating plate 16 becomes about 359 nm.

As mentioned above, the double refraction index Δn of the liquid crystal layer 13 is also selectable as a parameter, and the retardation Δn·d is changeable by the double refraction index Δn and the cell thickness d of the liquid crystal layer 13. Therefore, it is possible to improve the contrast of images furthermore with the use of the optimum phase compensating plate 16.

Figure 19:
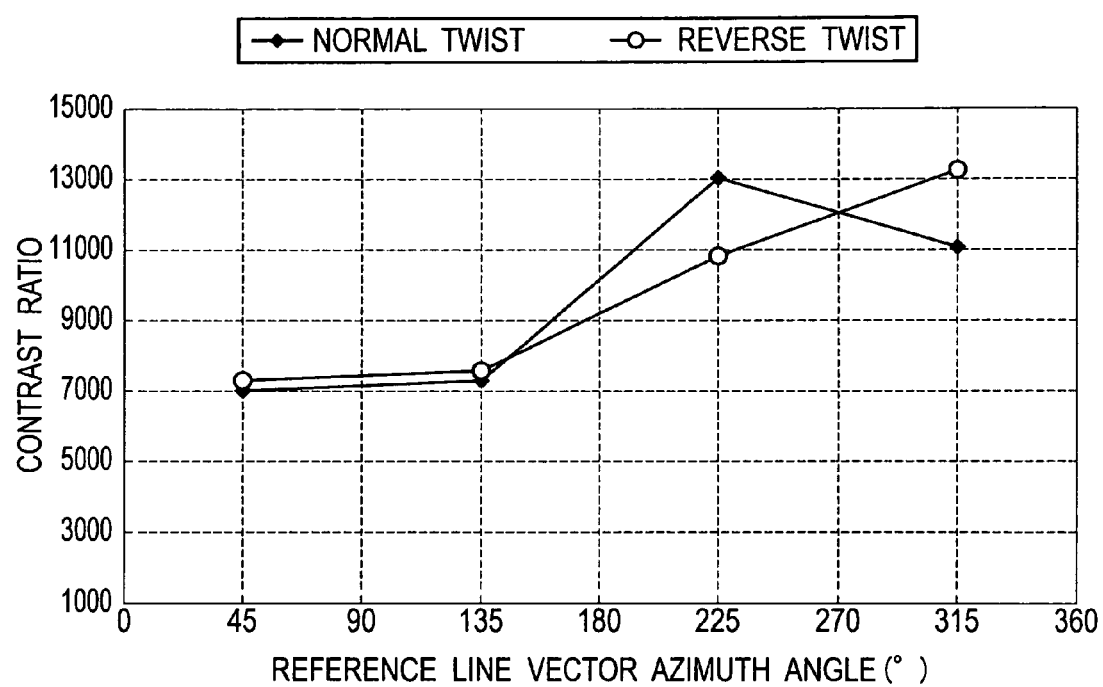
FIG. 19 is a diagram showing the relationship between contrast and reference line vector azimuth angle in case of using a phase compensating plate.

FIG. 19 is a diagram showing the relationship between a contrast and a reference line vector azimuth angle in case of using the phase compensating plate.

If inserting this phase compensating plate (C plate) 16, as shown in FIG. 19, then the contrast ratio of displayed images increases severalfold to about tenfold. Even in a case like this, the relationship between the reference line azimuth angle and the contrast is as described before.

In addition, it is possible to establish the twist angle φ at the liquid crystal layer 13 within the range of 110° to 130°. As for the liquid crystal, there can be employed a liquid crystal having a refraction index Δn=0.132 or Δn=0.085, provided that the wavelength of light is equal to 550 nm (green). Although the light from the light source is dissolved into three primary colors by the color separating means in common with the embodiments, lights from three LED (light-emitting diodes) or laser light sources may be irradiated to respective wire grids in a modification According to the present invention, with the adoption of a projection type display device combining a vertically-aligned reflection type liquid crystal display device having a twist with a wire-grid polarizing beam splitter, it is possible to realize high contrast and minimize the influence of disclination, allowing high-quality images to be displayed.

Finally, it will be understood by those skilled in the art that the foregoing descriptions are nothing but embodiments and various modifications of the disclosed projection type display device and therefore, various changes and modifications may be made within the scope of claims.

What is claimed is:

1. A projection type display device comprising:
   a light source;
   a reflection type liquid crystal display device allowing an incidence of an illumination light from the light source through a wire-grid type polarization beam splitter for polarizing the illumination light; and
   an imaging lens system for providing an image from a modulated light which has been polarized, modulated and reflected by the reflection type liquid crystal display device and subsequently diverged from an optical path for the light source by the wire-grid type polarization beam splitter, wherein
   the reflection type liquid crystal display device includes a first transparent substrate having a transparent electrode formed therein and allowing an incidence of the illumination light, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative,
   the wire-grid type polarization beam splitter is arranged so as to have its polarization spectroscopic surface inclined to the first substrate of the reflection type liquid crystal display device, the wire-grid type polarization beam splitter also having wire grids formed on the polarization spectroscopic surface and also arranged parallel to the first substrate,
   the each of the reflection type liquid crystal display devices is either:
   a first twist type liquid crystal display device where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line; or
   a second twist type liquid crystal display device where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line,
   the wire-grid type polarization beam splitters are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and
   assuming one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis,
   the first twist type liquid crystal display device has its reference line's vector disposed within a range of 225°±10° in the counterclockwise direction from the direction of X-axis, in view from the first substrate, and
   the second twist type liquid crystal display device has its reference line's vector disposed within a range of 315°±10° in the counterclockwise direction from the direction of X-axis, in view from the first substrate.

2. A projection type display device comprising:
   illumination-light generating means for generating multicolor illumination lights containing different band components from each other;
   reflection type liquid crystal display devices for respective colors allowing an incidence of the multicolor illumination lights from the illumination-light generating means through wire-grid type polarization beam splitters for polarizing the multicolor illumination lights respectively;
   color synthesizing means for synthesizing modulated lights for respective colors, the modulated lights being produced since the illumination lights have been polarized, modulated and reflected by the reflection type liquid crystal display devices and successively diverged from an optical path for the illumination-light generating means by the wire-grid type polarization beam splitters; and
   an imaging lens system for providing an image from the modulated lights transmitted through the color synthesizing means, wherein:
   each of the reflection type liquid crystal display devices includes a first transparent substrate having a transparent electrode formed therein and allowing an incidence of one of the illumination lights, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative,
   the each of the reflection type liquid crystal display devices is either:
   a first twist type liquid crystal display device where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line; or
   a second twist type liquid crystal display device where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the wire-grid type polarization beam splitters are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming, for each of the reflection type liquid crystal display devices, one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the first twist type liquid crystal display device has its reference line's vector disposed within a range of 225°±10° in the counterclockwise direction from the direction of X-axis, in view from the first substrate, and the second twist type liquid crystal display device has its reference line's vector disposed within a range of 315°±10° in the counterclockwise direction from the direction of X-axis, in view from the first substrate.

3. The projection type display device of claim 2, wherein
the illumination-light generating means generates illumination lights corresponding to three primary colors of light respectively, the color synthesizing means includes a first optical multilayer membrane for reflecting only a light in a first color of the three primary colors selectively and transmitting lights in second and third colors and a second optical multilayer membrane for reflecting only the light in the second color of the three primary colors selectively and transmitting the lights in the first and third colors, the first optical multilayer membrane intersecting with the second optical multilayer membrane perpendicularly, the reflection type liquid crystal display devices comprise a first-color reflection type liquid crystal display device allowing an incidence of the illumination light in the first color, a second-color reflection type liquid crystal display device allowing an incidence of the illumination light in the second color a third-color reflection type liquid crystal display device allowing an incidence of the illumination light in the third color, all the reflection type liquid crystal display devices being the first twist type liquid crystal display devices, or the second twist type liquid crystal display devices, the modulated light in the first color from the first-color reflection type liquid crystal display device is reflected by the first optical multilayer membrane of the color synthesizing means, the modulated light in the second color from the second-color reflection type liquid crystal display device is reflected by the second optical multilayer membrane of the color synthesizing means, and the modulated light in the third color from the third-color reflection type liquid crystal display device is transmitted through the first optical multilayer membrane and the second optical multilayer membrane of the color synthesizing means.

4. The projection type display device of claim 3, wherein
the first color corresponds to red of the three primary colors,
the second color corresponds to blue of the three primary colors,
the third color corresponds to green of the three primary colors, and
the reflection type liquid crystal display devices comprise:
the second twist type liquid crystal display device allowing an incidence of the illumination light in red;
either the first twist type liquid crystal display device or the second twist type liquid crystal display device allowing an incidence of the illumination light in blue; and
the first twist type liquid crystal display device allowing an incidence of the illumination light in green.

5. The projection type display device of claim 3, wherein
the first color corresponds to red of the three primary colors,
the second color corresponds to blue of the three primary colors,
the third color corresponds to green of the three primary colors, and
the reflection type liquid crystal display devices comprise:
the first twist type liquid crystal display device allowing an incidence of the illumination light in red;
either the first twist type liquid crystal display device or the second twist type liquid crystal display device allowing an incidence of the illumination light in blue; and
the second twist type liquid crystal display device allowing an incidence of the illumination light in green.

6. A projection type display device comprising:
illumination-light generating means for generating illumination lights corresponding to three primary colors of light respectively;
reflection type liquid crystal display devices for respective colors on which illumination lights in corresponding primary-color band components are incident after the illumination lights have been polarized by wire-grid type polarization beam splitters arranged corresponding to the illumination lights in red, blue and green;
color synthesizing means having a first optical multilayer membrane for reflecting only a light in red of the three primary colors selectively and transmitting lights in blue and green and a second optical multilayer membrane for reflecting only the light in blue of the three primary colors selectively and transmitting the lights in red and green, the first optical multilayer membrane intersecting with the second optical multilayer membrane perpendicularly, thereby to synthesize modulated lights for respective colors, the modulated lights being produced since the illumination lights have been polarized in modulation and reflected by the reflection type liquid crystal display devices and successively diverged from an optical path for the illumination-light generating means by the wire-grid type polarization beam splitters; and
an imaging lens system for providing an image from the modulated lights transmitted through the color synthesizing means, wherein:
each of the reflection type liquid crystal display devices includes a first transparent substrate having a transparent electrode formed therein and allowing an incidence of one of the illumination lights, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative, the reflection type liquid crystal display devices comprises:
one first twist type liquid crystal display device for green where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line, the first twist type liquid crystal display device for green allowing an incidence of the illumination light in green; and two second twist type liquid crystal display devices for red and blue where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the second twist type liquid crystal display devices for red and blue allowing an incidence of the illumination lights in red and blue respectively, the wire-grid type polarization beam splitters for respective colors are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming, for each of the reflection type liquid crystal display devices, one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the one second twist type liquid crystal display device for red has its reference line's vector disposed within a range of 315°±10° in the counterclockwise direction from the direction of X-axis, in view from the first substrate, the other second twist type liquid crystal display device for blue its reference line's vector disposed within a range of 135°±10° in the counterclockwise direction from the direction of X-axis, in view from the first substrate, and the first twist type liquid crystal display device for green has its reference line's vector disposed within a range of 225°±10° in the counterclockwise direction from the direction of X-axis, in view from the first substrate the modulated light in red from the second twist type liquid crystal display devices for red is reflected by the first optical multilayer membrane of the color synthesizing means, the modulated light in blue from the second twist type liquid crystal display device for blue is reflected by the second optical multilayer membrane of the color synthesizing means, and the modulated light in green from the first twist type liquid crystal display device for green is transmitted through the first optical multilayer membrane and the second optical multilayer membrane of the color synthesizing means.

7. A projection type display device comprising:
illumination-light generating means for generating illumination lights corresponding to three primary colors of light respectively;

reflection type liquid crystal display devices for respective colors on which illumination lights in corresponding primary-color band components are incident after the illumination lights have been polarized by wire-grid type polarization beam splitters arranged corresponding to the illumination lights in red, blue and green;

color synthesizing means having a first optical multilayer membrane for reflecting only a light in red of the three primary colors selectively and transmitting lights in blue and green and a second optical multilayer membrane for reflecting only the light in blue of the three primary colors selectively and transmitting the lights in red and green, the first optical multilayer membrane intersecting with the second optical multilayer membrane perpendicularly, thereby to synthesize modulated lights for respective colors, the modulated lights being produced since the illumination lights have been polarized, modulated and reflected by the reflection type liquid crystal display devices and successively diverged from an optical path for the illumination-light generating means by the wire-grid type polarization beam splitters; and an imaging lens system for providing an image from the modulated lights transmitted through the color synthesizing means, wherein:

each of the reflection type liquid crystal display devices includes a first transparent substrate having a transparent electrode formed therein and allowing an incidence of one of the illumination lights, a second substrate opposed parallel to the first substrate through a gap and having reflecting electrodes and drive circuits arranged in matrix for every pixel thereby to reflect the illumination light transmitted through the first substrate and emit the illumination light therethrough and a liquid crystal layer enclosed between the first substrate and the second substrate to polarize and modulate the illumination light transmitted through the first substrate and also composed of nematic liquid crystal whose dielectric anisotropy is negative, the reflection type liquid crystal display devices comprises:
two first twist type liquid crystal display device for red and blue where, in view from the first substrate, liquid crystal molecules on the side of the second substrate are aligned in the clockwise direction with respect to a predetermined reference line and liquid crystal molecules on the side of the first substrate are aligned in the counterclockwise direction with respect to the predetermined reference line, the first twist type liquid crystal display devices for red and blue allowing an incidence of the illumination lights in red and blue respectively; and one second twist type liquid crystal display devices for green where, in view from the first substrate, liquid crystal molecules on the side of the second substrate are aligned in the counterclockwise direction with respect to a predetermined reference line and liquid crystal molecules on the side of the first substrate are aligned in the clockwise direction with respect to the predetermined reference line, the second twist type liquid crystal display device for green allowing an incidence of the illumination light in green, the wire-grid type polarization beam splitters for respective colors are arranged so as to have their polarization spectroscopic surfaces inclined to the first substrates of the reflection type liquid crystal display devices, the wire-grid type polarization beam splitter also having wire grids formed on the polarization spectroscopic surfaces and also arranged parallel to the first substrates, and assuming, for each of the reflection type liquid crystal display devices, one of directions of projection lines obtained by projecting the wire grids on the second substrate vertically, the one direction being directed to a direction where one extension surface of the polarization spectroscopic surface intersects with another extension surface of the second substrate when the one direction is turned in the counterclockwise direction by 90°, is represented by X-axis, the one first twist type liquid crystal display device for red has its reference line's vector disposed within a range of 225°±10° in the counterclockwise direction from the direction of X-axis, in view from the first substrate, the other first twist type liquid crystal display device for blue its reference line's vector disposed within a range of 45°±10° in the counterclockwise direction from the direction of X-axis, in view from the first substrate, and the second twist type liquid crystal display device for green has its reference line's vector disposed within a range of 315°±10° in the counterclockwise direction from the direction of X-axis, in view from the first substrate the modulated light in red from the first twist type liquid crystal display devices for red is reflected by the first optical multilayer membrane of the color synthesizing means, the modulated light in blue from the first twist type liquid crystal display device for blue is reflected by the second optical multilayer membrane of the color synthesizing means, and the modulated light in green from the second twist type liquid crystal display device for green is transmitted through the first optical multilayer membrane and the second optical multilayer membrane of the color synthesizing means.

* * * * *